United States Patent
Ashjaee

(10) Patent No.: US 9,720,093 B2
(45) Date of Patent: Aug. 1, 2017

(54) LAND SURVEYING USING GNSS DEVICE

(71) Applicant: JAVAD GNSS, Inc., San Jose, CA (US)

(72) Inventor: Javad Ashjaee, Saratoga, CA (US)

(73) Assignee: JAVAD GNSS, INC., San Jose, CA (US)

( * ) Notice: Subject to any disclaimer, the term of this patent is extended or adjusted under 35 U.S.C. 154(b) by 924 days.

(21) Appl. No.: 13/975,142

(22) Filed: Aug. 23, 2013

(65) Prior Publication Data

US 2015/0054685 A1 Feb. 26, 2015

(51) Int. Cl.
*G01V 3/38* (2006.01)
*G01S 19/14* (2010.01)
*G01C 7/02* (2006.01)

(52) U.S. Cl.
CPC .............. *G01S 19/14* (2013.01); *G01C 7/02* (2013.01)

(58) Field of Classification Search
CPC ....... G01S 2013/9357; G01S 2013/936; G01S 2013/9367; G01S 2013/9375; G01S 2013/9378; G01S 2013/9382; G01S 5/0018; G01S 5/0036; G01S 5/0205; G01S 5/021; G01S 5/0263; G01S 5/04; G01S 5/06
See application file for complete search history.

(56) References Cited

U.S. PATENT DOCUMENTS

| | | | |
|---|---|---|---|
| 8,022,868 B2 | 9/2011 | Yudanov et al. | |
| 8,094,087 B2 | 1/2012 | Ashjaee et al. | |
| 8,120,527 B2 | 2/2012 | Ashjaee et al. | |
| 8,125,376 B1 | 2/2012 | Ashjaee et al. | |
| 8,169,379 B2 | 5/2012 | Zhukov et al. | |
| 8,224,525 B1 | 7/2012 | Rapoport et al. | |
| 8,606,498 B2 | 12/2013 | Pesterev et al. | |
| 8,717,232 B2 | 5/2014 | Ashjaee et al. | |
| 8,717,233 B2 | 5/2014 | Ashjaee et al. | |
| 8,872,700 B2 | 10/2014 | Ashjaee et al. | |
| 2002/0082775 A1* | 6/2002 | Meadows | A63B 57/00 701/472 |
| 2009/0312948 A1* | 12/2009 | Matthews | G01C 21/30 701/472 |
| 2011/0075886 A1 | 3/2011 | Ashjaee et al. | |
| 2011/0231057 A1 | 9/2011 | Ashjaee et al. | |
| 2012/0229333 A1 | 9/2012 | Ashjaee et al. | |
| 2012/0299936 A1 | 11/2012 | Ashjaee et al. | |
| 2013/0080051 A1 | 3/2013 | Gribkov et al. | |
| 2013/0113571 A1 | 5/2013 | Ashjaee et al. | |
| 2014/0062778 A1 | 3/2014 | Ashjaee et al. | |

* cited by examiner

*Primary Examiner* — Roy Y Yi
(74) *Attorney, Agent, or Firm* — Morrison & Foerster LLP

(57) ABSTRACT

Systems and methods for surveying using a GNSS device are provided. In one example method, a GNSS device may be used to determine the location of points along a path and to add those points to a set of points representing the path. When adding each point, the device may determine if the point represents a new point or a previously measured point. If the point is a new point, the device may add the point to the set of points. If the point is a previously measured point, the device may display one or more previously measured points to allow the user to select which previously measured point corresponds to the point currently being measured. The user may select a previously measured point and a point may be added to the set of points using the location of the selected previously measured point.

32 Claims, 21 Drawing Sheets

| | |
|---|---|
| Elapsed Time Since Last Record Reaches | 10 sec > ☑ |
| Travelled Distance Since Last Record Reaches | 10 m > ☑ |
| Horizontal Off-Line Since Last Record Reaches | 10 cm > ☑ |
| Vertical Off-Line Since Last Record Reaches | 5 cm > ☑ |
| Except If Travelled Distance Since Last Record Is Less Than | 5 cm > ☑ |

Interface 700

Figure 7

LAND SURVEYING USING GNSS DEVICE

BACKGROUND

1. Field

The present disclosure relates to Global Navigation Satellite System (GNSS) devices and, more specifically, to surveying using a GNSS device.

2. Related Art

Navigation receivers that use global navigation satellite systems, such as GPS or GLONASS (hereinafter collectively referred to as "GNSS"), enable a highly accurate determination of the position of the receiver. The satellite signals may comprise carrier signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x,y,z)^T$, as well as to compensate for the receiver clock offset.

Surveyors may use GNSS devices to measure points representing boundaries between plots of land, paths to be traversed, and the like. Typically, the surveyor may traverse a boundary or path to be surveyed and may use a GNSS device to measure and record the locations of points along the way. Processing software may then be used to plot the measured points to generate a computer representation of the boundary or path. For example, to survey the closed rectangular boundary of plot of land 100 shown in FIG. 1, the surveyor may first walk to point 101 to measure and record the location of the point. The surveyor may then proceed to measure and record the locations of points 103, 105, and 107. However, since the boundary of plot 100 has a closed shape, the surveyor may be required to return to point 101 to measure and record the location of the point. Based on the order that the points were recorded, processing software may be used to connect points 101 and 103, 103 and 105, 105 and 107, and 107 and 101, as shown in FIG. 1.

While this technique can be used to define any desired closed shape, problems may occur if the measured locations for junctions (e.g., points requiring multiple measurements), such as point 101, are not identical. In particular, the processing software may incorrectly connect the measured points, thereby generating incorrect boundaries for the plot of land. For instance, if the second measurement of point 101 does not match the first measurement of point 101, the processing software may generate a line having four segments rather than the closed rectangular shape shown in FIG. 1. These measurement inconsistencies can be caused by the user positioning the GNSS device at slightly different positions for each junction measurement and/or measurement errors of the GNSS device.

BRIEF SUMMARY

Processes for surveying a path using a global navigation satellite system (GNSS) device are provided. One example process includes: receiving, by the GNSS device, a request to add a point on the path to a set of points; determining a location of the point; determining if the point is a new point or a previously measured point from the set of points; in response to determining that the point is a new point, adding the point to the set of points using the determined location of the point; and in response to determining that the point is a previously measured point from the set of points, adding the point to the set of points using a location of a corresponding point from the set of points.

In some examples, the request to add the point on the path to the set of points identifies the point as being a new point or a previously measured point from the set of points, and wherein determining if the point is a new point or a previously measured point from the set of points is performed based on the request.

In some examples, determining if the point is a new point or a previously measured point from the set of points comprises: determining that the point is a previously measured point if the location of the point is within a threshold distance to a location of a point in the set of points; and determining that the point is a new point if the location of the point is not within the threshold distance to a location of a point in the set of points.

In some examples, the process further includes in response to determining that only a single point from the set of points has a location within the threshold distance from the location of the point, selecting the single point to be the corresponding point from the set of points; and in response to determining that more than one point from the set of points has a location within the threshold distance from the location of the point: causing a display of at least a portion of the previously measured points from the set of points; and receiving a selection of one of the displayed previously measured points, wherein the selected previously measured point is used as the corresponding point from the set of points.

In some examples, the at least a portion of the previously measured points from the set of points comprises all points from the set of points having locations within the threshold distance from the point.

In some examples, adding the point to the set of points using the determined location of the point comprises storing the point and the determined location of the point in a data structure representing the set of points. In other examples, adding the point to the set of points using the location of the corresponding point from the set of points comprises storing the point and the location of the corresponding point from the set of points in a data structure representing the set of points.

In some examples, the set of points comprises associated data for each point in the set of points, and wherein the associated data comprises a location of each point in the set of points, an identification of an object that each point in the set of points represents, a unique identifier for each point in the set of points, a tag identifying each point in the set of points as a junction or non-junction point, and an indicator identifying each point in the set of points as being a straight point or a curved point.

In some examples, the process further comprises plotting the points in the set of points to generate a computer generated representation of the path. In other examples, each point in the set of points is identified as being a straight point or a curved point and plotting the points comprises connecting straight points with straight lines and connecting curved points with polynomial segments.

Another example process for surveying a path using a global navigation satellite system (GNSS) device includes measuring, by the GNSS device, a location associated with the GNSS device; determining if a trigger condition has occurred, wherein the trigger condition comprises a threshold length of time since a last point was recorded, a threshold distance traveled since the last point was recorded, and a threshold deviation from a projected path; and in response to the trigger condition occurring, recording the measured location as a point in a set of points.

In some examples, the trigger condition occurs if any of the threshold length of time since the last point was recorded, the threshold distance traveled since the last point was recorded, and the threshold deviation from a projected path is reached.

In some examples, the trigger condition further comprises a minimum distance traveled since the last point was recorded, and wherein the trigger condition does not occur unless the minimum distance traveled since the last point was recorded is reached.

In some examples, the threshold deviation from the projected path comprises a threshold horizontal deviation or a threshold vertical deviation from the projected path.

In some examples, the projected path is generated based on a linear extrapolation of the at least two most recently recorded points in the set of points.

In some examples, recording the measured location as the point in the set of points comprises: storing the point and associated data in a data structure representing the set of points; and identifying the point as a straight point or a curved point, wherein the point is identified as a straight point if the threshold length of time since the last point was recorded or the threshold distance traveled since the last point was recorded caused the trigger condition to occur, and wherein the point is identified as a curved point if the threshold deviation from the projected path caused the trigger condition to occur.

In some examples, process further comprises plotting the points in the set of points to generate a computer generated representation of the path. In other examples, each point in the set of points is identified as being a straight point or a curved point, and wherein plotting the points comprises connecting straight points with straight lines and connecting curved points with polynomial segments.

Apparatus for performing these processes are also provided.

BRIEF DESCRIPTION OF THE DRAWINGS

FIG. 7 illustrates an exemplary interface for configuring variables for the process shown in FIG. 6.

In the following description, reference is made to the accompanying drawings which form a part thereof, and which illustrate several embodiments of the present disclosure. It is understood that other embodiments may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention as claimed. Thus, the various embodiments are not intended to be limited to the examples described herein and shown, but are to be accorded the scope consistent with the claims.

Systems and methods for surveying using a GNSS device are provided. In one example method, a GNSS device may be used to determine the location of points along a path and to add those points to a set of points representing the path. When adding each point, the device may determine if the point represents a new point or a previously measured point from the set of points. If the point is a new point, the device may add the point to the set of points. If the point is a previously measured point, the device may display one or more previously measured points from the set of points to allow the user to select which previously measured point corresponds to the point currently being measured. However, the device may select the point if there is only a single point within a threshold distance from the device. The user may select a previously measured point and a point may be added to the set of points using the location of the selected previously measured point. The set of points may then be processed to generate a computer representation of the surveyed path.

Figure 1:
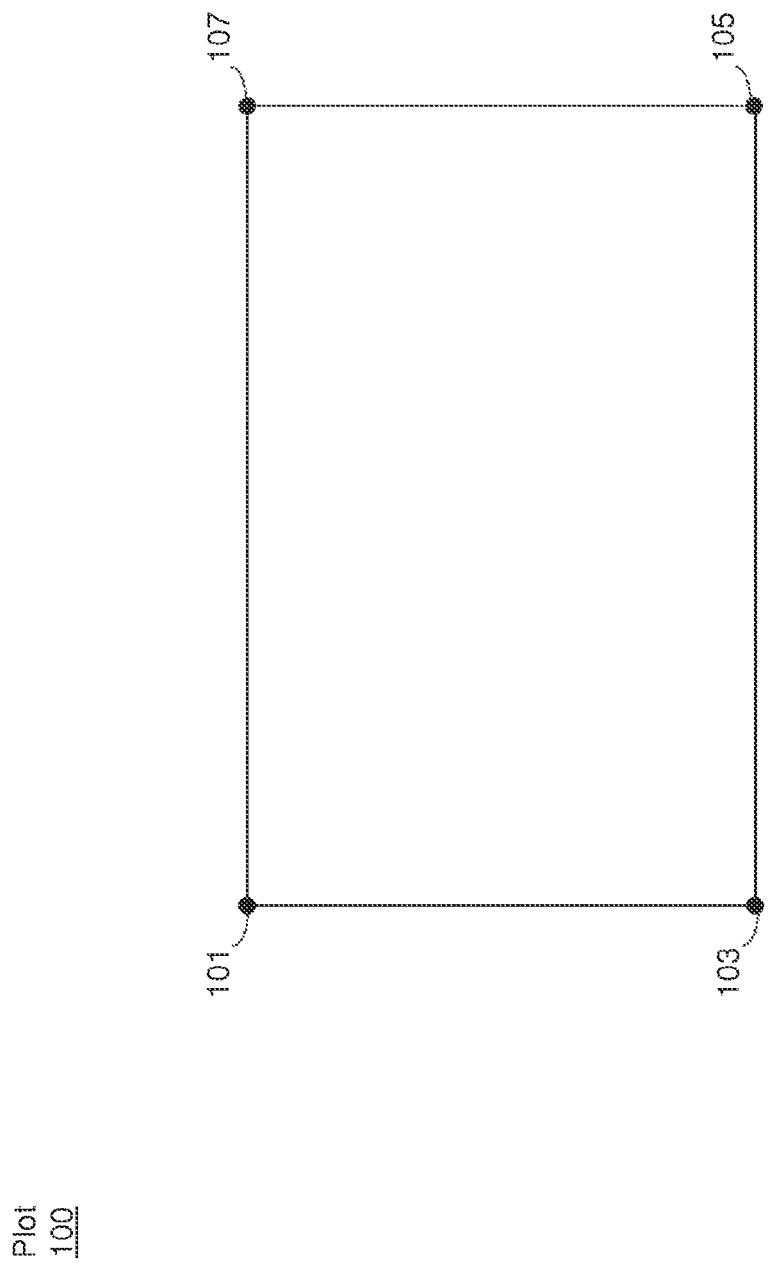
FIG. 1 illustrates an exemplary plot of land that may be surveyed using a GNSS device according to various examples.
Figure 2:
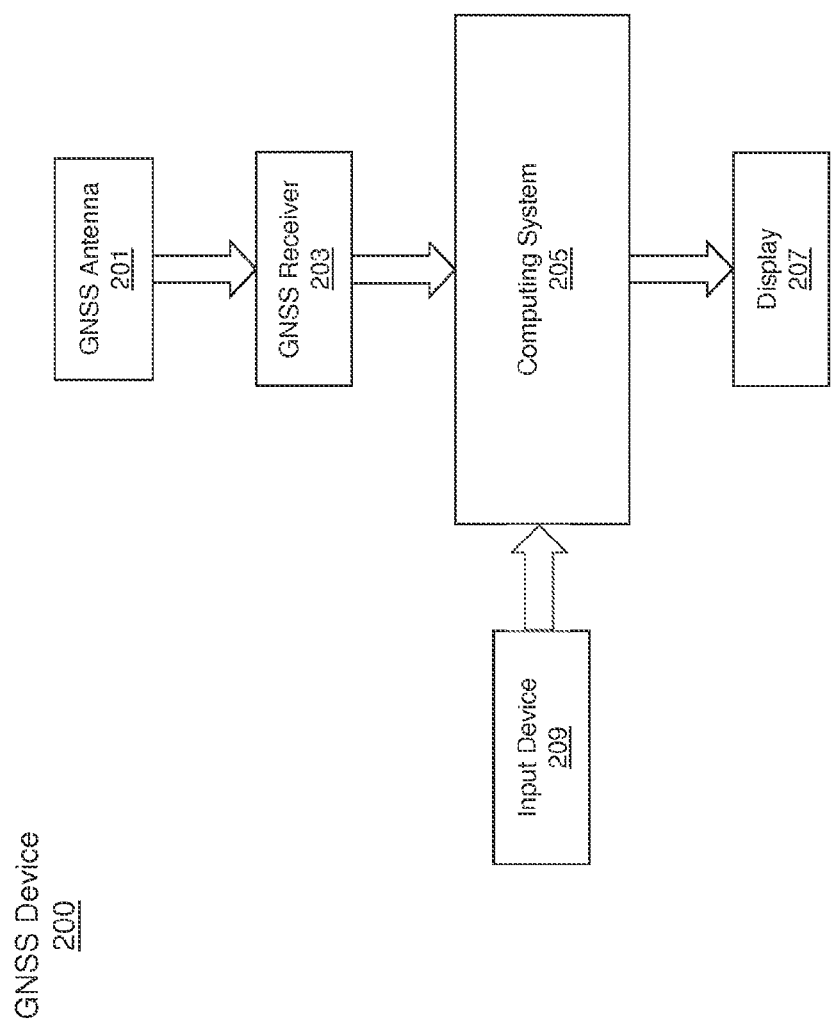
FIG. 2 illustrates a block diagram of an exemplary GNSS device according to various examples.

FIG. 2 illustrates a block diagram of an example GNSS device 200 according to various examples. Device 200 may include GNSS receiver 203 coupled to receive GNSS satellite signals via GNSS antenna 201. GNSS receiver 203 may include typical receiver circuitry, such as a amplifiers, oscillators, frequency synthesizers, down converters, automatic gain control (AGC) circuits, analog-to-digital converters (ADCs), demodulators, and the like, for performing amplification, filtering, frequency down-conversion, sampling, and demodulation. However, one of ordinary skill in the art will appreciate that other analog or digital circuitry may be included within GNSS receiver 203 as appropriate for a given application.

GNSS receiver 203 may be configured to convert the received GNSS satellite signals into Earth-based coordinates, such as WGS84, ECEF, ENU, and the like. GNSS receiver 203 may further transmit the received GNSS signals and/or converted coordinates to computing system 205 for processing. As will be described in greater detail below, computing system 205 may be configured to store the converted coordinates as points used to survey plots of land. Computing system 205 may cause a display of some or all of the stored coordinates and may prompt the user for input by providing display data to display 207. Computing system 205 may receive user input via input device 209, which may include any desired type of input device, such as a keyboard, mouse, physical button, touch sensitive display, or the like.

In some examples, GNSS device 200 may be included within a portable handheld geodesic device, such as that described in U.S. Patent Publication No. 2012/0299936 or U.S. Pat. No. 8,125,376, which are incorporated by reference herein in their entirety for all purposes.

Figure 3:
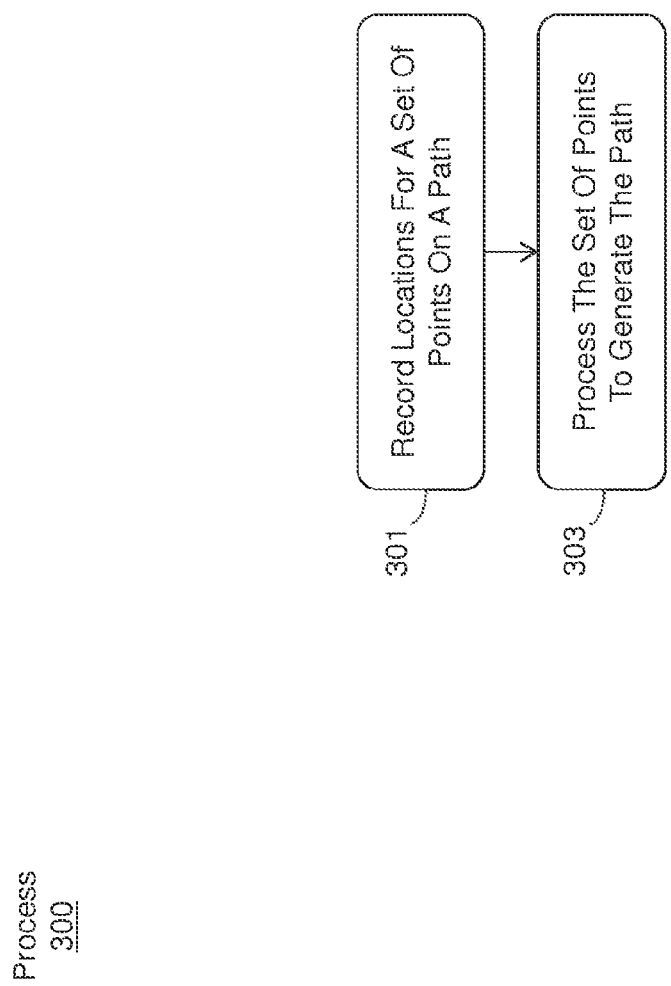
FIG. 3 illustrates an exemplary process for surveying using a GNSS device and plotting the results according to various examples.

FIG. 3 illustrates an exemplary process 300 for surveying land using a GNSS device and plotting the results according to various examples. Process 300 may be performed using a GNSS device similar or identical to GNSS device 200 with or without the aid of an external computing system.

At block 301 of process 300, the locations for a set of points on a path may be determined and recorded. In some examples, A GNSS device similar or identical to GNSS device 200 may be positioned at various points along the path and may be used to determine and record locations for each of the points. The path may form a closed shape (e.g., when representing a perimeter enclosing a plot of land) or an open shape (e.g., when representing a boundary separating plots of land, a path to be navigated, or the like).

Figure 4:
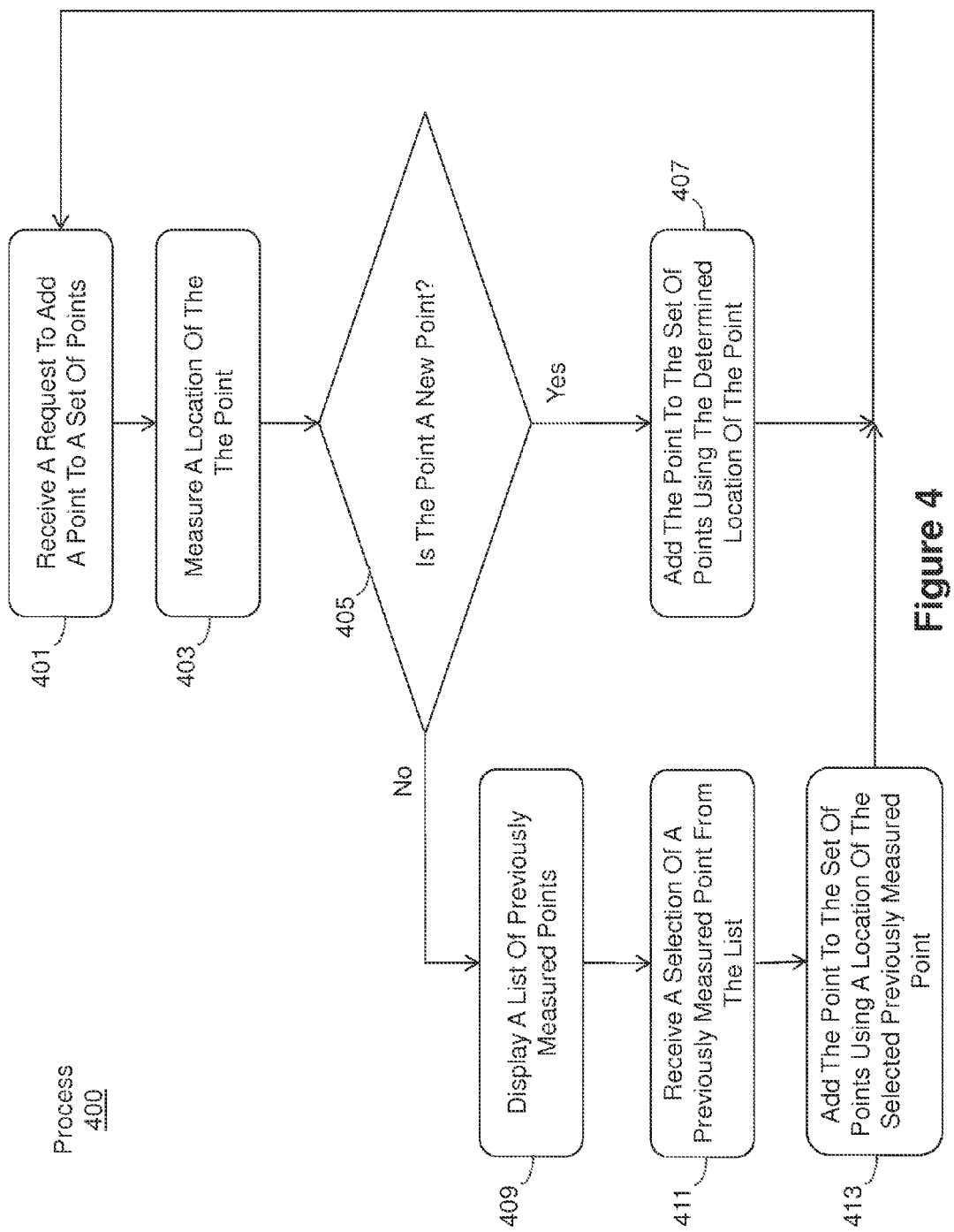
FIG. 4 illustrates an exemplary process for surveying a path using a GNSS device according to various examples.
Figure 5:
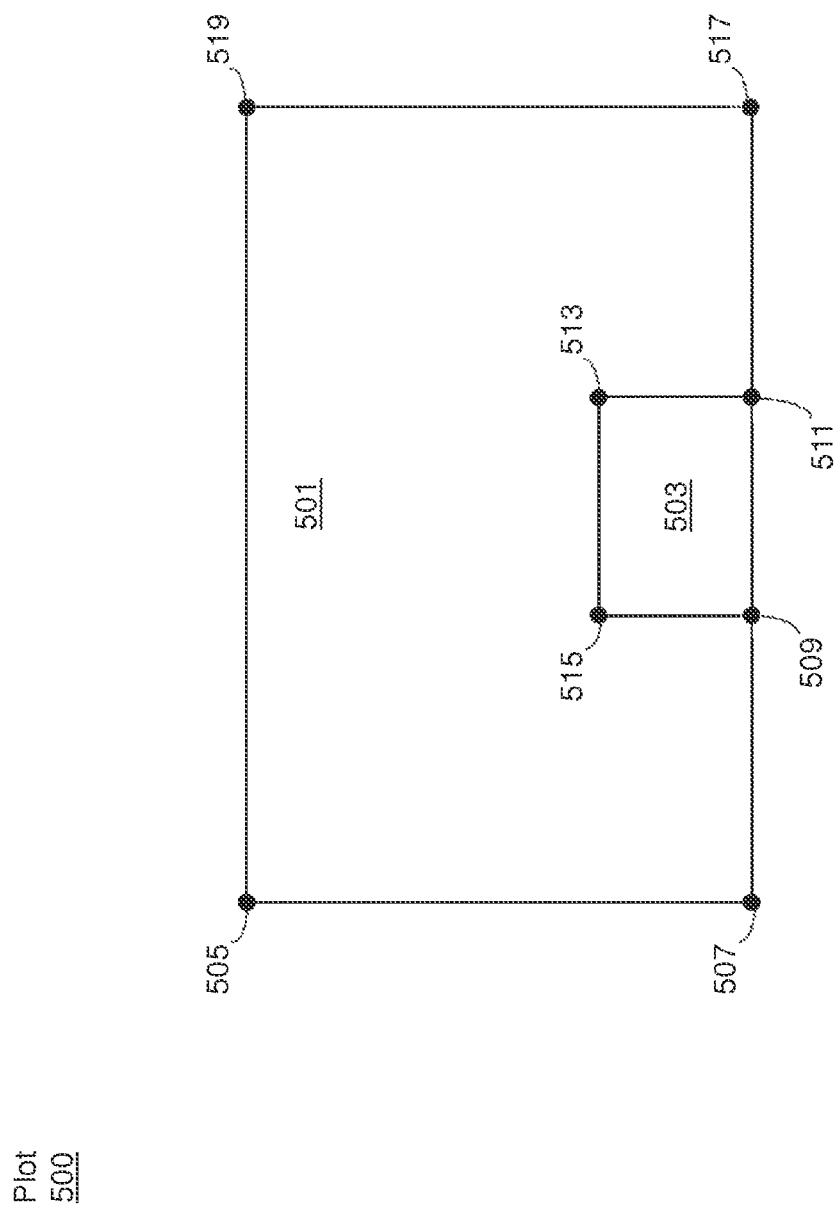
FIG. 5 illustrates the surveying of a plot of land using the process shown in FIG. 4.

FIG. 4 illustrates an exemplary process 400 that may be performed at block 301 of process 300 to determine and record the locations for a set of points on a path. In particular, process 400 may be used to manually determine and record points on a path having either a closed shape or an open shape using a GNSS device. Process 400 will be described below with reference to the plot of land 500 shown in FIG. 5. This example plot 500 includes a first outer portion 501 (e.g., representing a garden) and a second inner portion 503 (e.g., representing a flowerbed within the garden). As shown, each portion 501, 503 has a closed rectangular shape and both portions share one common edge at the bottom of the figure. FIG. 5 further shows an example set of points 505, 507, 509, 511, 513, 515, 517, and 519 that may be surveyed using process 400 to properly define the boundaries of outer and inner portions 501 and 503.

Referring back to FIG. 4, at block 401, a request may be received from a user to add a point on a path to a set of points representing that path. The request may be received via an input device, such as input device 209, and may indicate a desire to measure a location at or near the GNSS device (e.g., a point on the ground below the GNSS device). In some examples, the request may include a request to measure the location of the point and may explicitly identify the point as being a new point or a junction that was previously measured (e.g., identified by using one of two physical or virtual buttons). A new point may refer a point that was not previously measured by the user and a junction may refer to a point that may require the user to measure it multiple times. For example, to enclose portion 501 of plot 500, a user may be required to measure the location of point 505 a first time in order to define the start of the path and may be required to measure the location of point 505 a second time in order to define the end of the path. As such, point 505 may be referred to as a junction. Thus, in some examples, a user may identify the point to be added to the set of points as being either a new point (e.g., a non-junction point or a junction that was not previously measured) or a previously measured junction. In other examples, the request may include a request to measure the location of the point (e.g., made using a single physical or virtual button) without explicitly identify the point as being a new point or a junction that was previously measured.

Additionally, in some examples, the request may further identify the point as being a straight point, representing a point along a straight portion of a path, or a curved point, representing a point along a curved portion of a path. In these examples, a selectable option may be provided to the user (e.g., via display 207 or other input means) to identify the type of point.

In some examples, the request may further identify the point as being a junction, meaning that the location of the point may be measured multiple times (e.g., to enclose a boundary) or non-junction point, meaning the point may be measured only once.

To illustrate, referring to FIG. 5, a user may begin surveying plot of land 500 by traveling to point 505 with GNSS device 200. Since point 505 connects straight segments of a path (e.g., segments between points 505 and 507 and between points 505 and 519), the user may identify the point as being a straight point. In some examples, the user may further identify the point as being a new point since no previous measurements have been made at point 505. In other examples, the user may simply request that a measurement be taken without explicitly identify the point as being a new point.

Referring back to FIG. 4, at block 403, the GNSS device may measure the location of the point by converting received satellite signals into Earth-based coordinates, such as WGS84, ECEF, ENU, or the like. For instance, continuing with the example provided above, GNSS device 200 may measure the location of point 505 in response to the user requesting that the point be added to the set of points.

At block 405, it may be determined if the point is a new point or a previously measured junction. If it is determined that the point is a new point, the process may proceed to block 407. If it is instead determined that the point is a previously measured junction, then the process may proceed to block 409.

In some examples where the user explicitly identifies the requested point as being a new point or a previously measured junction at block 401, the determination made at block 405 may be based on this user input. For example, if the user identified the point as being a new point at block 401, the process may proceed to block 407. If the user instead identified the point as being a previously measured junction, the process may proceed to block 409.

In other examples where the user does not explicitly identify the requested point as being a new point or a previously measured junction at block 401, block 405 may include comparing the location of the point determined at block 403 with previously measured points in the set of points representing the path to determine if any of the previously measured points have locations within a threshold distance of the current point. The threshold distance may have any desired value and may be selected based on expected user error in positioning the GNSS device and/or device error in obtaining position measurements. In some examples, the threshold distance may be selected to be less than the minimum distance between the points intended to be measured, but higher than the accuracy of the device. For example, in geodesic receivers, a threshold distance of 5 cm may be used. In this way, the GNSS device may determine if the current point is potentially a previously measured junction. If it is determined that the location of the point measured at block 403 is not within the threshold distance of a previously measured point for the path, the process may proceed to block 407. Alternatively, if it is determined that the location of the point measured at block 403 is within the threshold distance of a previously measured point for the path, the user may be prompted to confirm that the point is a previously measured point or to indicate that the point is a new point. If the user indicates that the point is a new point, the process may proceed to block 407. If the user does not indicate that the point is a new point, the process may proceed to block 409.

In some examples, as discussed above, points may be tagged as junction or non-junction points. In these examples, only locations for points tagged as junctions may be compared to the currently measured point to determine if they are within the threshold distance of the currently measured point. This may reduce the amount of computation required by the GNSS device and reduce the number of potential points presented to the user (at block 409).

To illustrate, continuing with the example provided above, if the user explicitly identified point 505 as being a new point at block 401, the process may proceed from block 405 to block 407. Alternatively, if the user did not explicitly identify the point as being a new point or a previously measured junction, the location of point 505 determined at block 403 may be compared to locations of previously measured and stored points for the path to determine if any points are within a threshold distance to the current point. In this example, there are no other stored points for the path (junction or non-junction points). As a result, GNSS device 200 may determine that the measured point is not within a threshold distance of a previously stored point and may proceed to block 407.

At block 407, the current point and its location determined at block 403 may be added to the set of points representing the path. This may include storing the point and its associated data in a list or other data structure representing the path. The associated data may include the location determined at block 403, an identification of the object that the point represents (e.g., a tree, a manhole cover, a fence, etc.), a unique reference number identifying the relative position of the point within the path, a tag identifying the point as being a junction or a non-junction point, an indication identifying the point as a straight point or a curved point, or the like.

To illustrate, continuing with the example provided above, point 505 may be added to a list of points representing the path along with its associated data, such as the location of point 505 determined at block 403, point type identifier of "fence" (indicating that it is a point along a path segment representing a fence), a reference number of 1 (indicating that it is the first measured point for the path), a junction tag (indicating that it is a junction point), and point type identifier of "straight" (identifying the point as being a point along a straight portion of the path).

The process may then return to block 401 where another request to measure a point on the path may be received. Blocks 401, 403, 405, and 407 may be repeated any number of times to add new points to the set of points representing the path. For example, a user may travel from point 505 to point 507 and may indicate a desire to add a new point to the set of points representing the path using GNSS device 200. As a result, blocks 401, 403, 405, and 407 may be performed to receive the user's request, measure the location of the point, determine if the point is a new point, and add point 507 and its associated data to the set of points representing the path. The user may similarly proceed to points 509, 511, 513, and 515 to cause GNSS device 200 to repeatedly perform blocks 401, 403, 405, and 407 to add these points to the set of points for the path outlining portions 501 and 503 of plot 500.

However, when a user attempts to add a point to the set of points that is not a new point (e.g., a previously measured junction), a negative determination may instead be made at block 405.

To illustrate, continuing with the example provided above, if the user explicitly identified point 509 as being a previously measured junction at block 401, the process may proceed from block 405 to block 409. Alternatively, if the user did not explicitly identify the point as being a new point or a previously measured junction, the location of point 509 determined at block 403 may be compared to locations of previously measured and stored points for the path to determine if any points are within a threshold distance to the current point. In this example, the location of the previously measured and stored point 509 may be within the threshold distance of the current measurement of point 509. As a result, GNSS device 200 may determine at block 405 that the measured point is within a threshold distance of a previously stored point and may proceed to block 409.

At block 409, a list of previously measured points may be displayed to the user. In some examples, the list may include the previously measured points that have locations within the threshold distance from the current measured point. In other examples, the list may include all previously measured points, regardless of their proximity to the current measured point. The list of previously measured points may be limited to only those points tagged as junctions, or may include all previously measured points for the path. In some examples, the list may be ordered based on proximity to the current measured point. In yet other examples, the list may be filtered based on the associated data of the stored points. For example, the previously measured points based on the type of object it represents, its unique reference number, or whether the point is a straight point or a curved point. If the user did not explicitly identify the point as being a new point or a previously measured junction at block 401, the display of the list of previously measured points may be combined with the prompt provided to the user at block 405 requesting that the user confirm that the point is a previously measured point or to indicate that the point is a new point.

To illustrate, continuing with the example provided above. GNSS device 200 may display a list containing the previous measurement for point 509 on display 207 in response to determining that the current point is a previously measured junction.

At block 411, a selection of a previously measured point from the list of previously measured points displayed at block 409 may be received. The selection may be received from a user using an input device, such as input device 209 of GNSS device 200. At block 413, the point requested at block 401 may be added to the set of points using the location of the previously measured point selected at block 411. This may further include storing the point using some or all of the associated data (e.g., location, identification of the object that the point represents, a tag identifying the point as a junction or non-junction point, an indication identifying the point as a straight point or curved point, or the like) of the previously measured point selected at block 411 in a list or other data structure representing the path. However, the new point may be stored with its own unique reference number identifying the relative position of the point within the path.

In some examples, if only a single previously measured point exists within the threshold distance from the current measured point, blocks 409 and 411 may be skipped and the device may automatically select and add the point to the set of points using the previously measured point to the set of points at block 413.

To illustrate, continuing with the example provided above, the user may select the previous measurement for point 509 displayed on display 207 of GNSS device 200. In response, the point that the user requested to add to the path at block 401 may be added to the list of points representing the path using the location and other associated data of point 509. Alternatively, since there is only one previous measurement for point 509, GNSS device 200 may automatically add the point (requested at block 401) to the list of points representing the path using the location and other associated data of point 509.

The process may then return to block 401 where another request to measure a point on the path may be received. Blocks 401, 403, 405, and 407 may be repeated any number of times to add new points to the set of points representing the path and blocks 401, 403, 405, 409, 411, and 413 may be repeated any number of times to add previously measured junctions to the set of points representing the path. For example, the user may travel from point 509 to point 511 and may indicate a desire to add the point to the set of points representing the path using GNSS device 200. As a result, blocks 401, 403, 405, 409, 411, and 413 may be performed to receive the user's request, measure the location of the point, determine if the point is a new point, and add point 511 and its associated data to the set of points representing the path. The user may further proceed to points 517 and 519 to cause GNSS device 200 to repeatedly perform blocks 401, 403, 405, and 407 to add these points to the set of points for the path. The user may finally proceed to point 505 to cause GNSS device 200 to perform blocks 401, 403, 405, 409, 411, and 413 to add this point to the set of points and to enclose portion 501 of plot 500.

Using process 400, the user may use a previous measurement for a junction, obviating the need for the user to replicate the measurement at the exact location of the previous measurement and avoiding measurement errors due to GNSS device tolerances. This advantageously allows the user to quickly and accurately add points to a path to ensure that measurements intended to be taken at the same point are recorded with the same location coordinates. The result may be a set of points on a path that properly encloses regions of land when processed.

Figure 6:
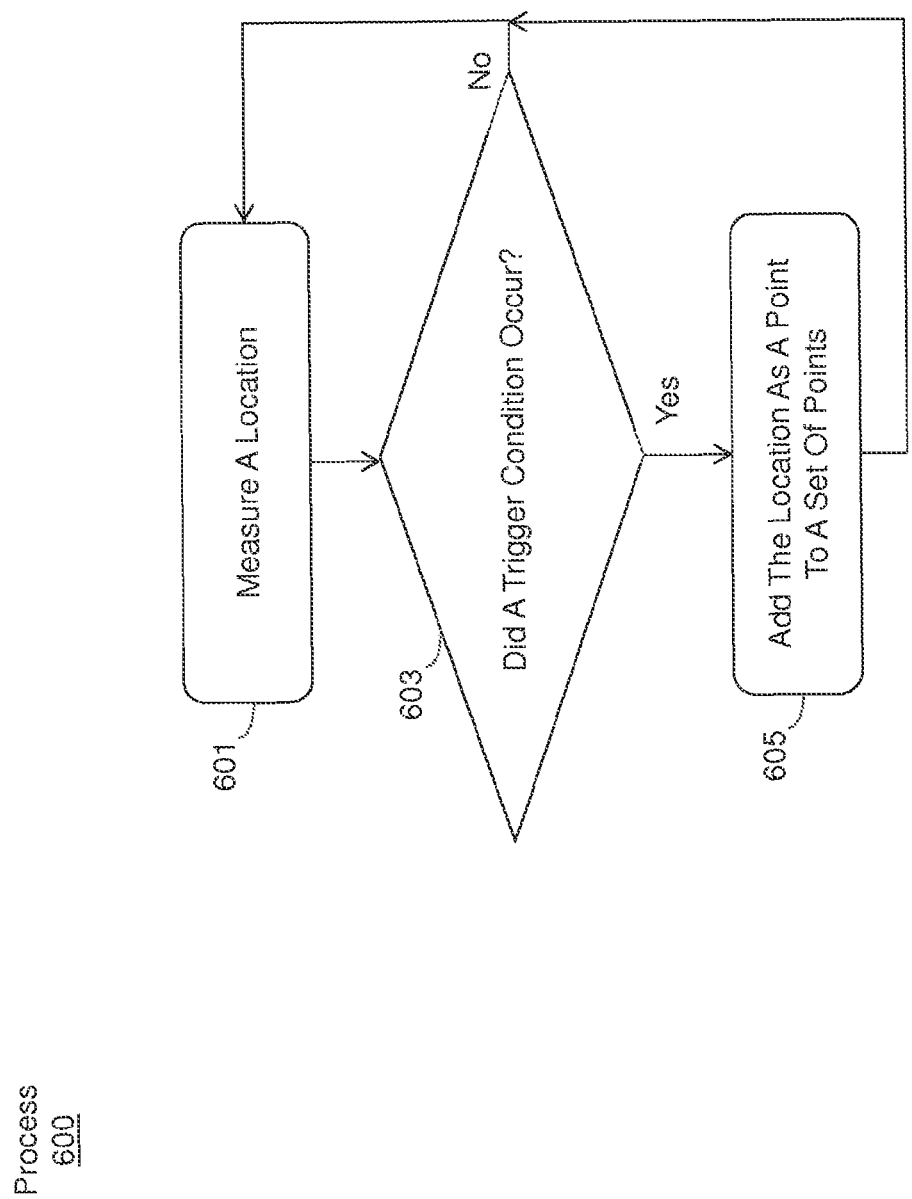
FIG. 6 illustrates another exemplary process for surveying a path using a GNSS device according to various examples.

FIG. 6 illustrates another exemplary process 600 that may be performed at block 301 of process 300 to determine and record the locations of a set of points on a path. In particular, process 600 may be used to automatically determine and record points on a path having an open shape using a GNSS device. For example, GNSS device 200 may travel along a path (e.g., on a vehicle) and may use process 600 to automatically measure and record locations of points along the path in response to a triggering condition. The triggering condition may be a distance traveled, a time traveled, or a horizontal or vertical deviation from the path.

At block 601 of process 600, a location of the GNSS device may be measured. For example, a GNSS device similar or identical to GNSS device 200 may measure its location by converting received satellite signals into Earth-based coordinates, such as WGS84, ECEF, ENU, or the like.

At block 603, it may be determined if a trigger condition has occurred. In some examples, the trigger condition may include a threshold distance traveled. For example, the GNSS device may be configured to record the location of a point every 10 m traveled. In other examples, the trigger condition may include a threshold time. For example, the GNSS device may be configured to record the location of a point every 10 seconds. In yet other examples, the trigger condition may include a threshold horizontal or vertical deviation from a path projected based on a number of previously stored points. For example, the GNSS device may be configured to record the location of a point if it is determined that the point deviated by more than 5 cm meters from a path generated from a linear extrapolation of the previous two points. While specific values have been provided, it should be appreciated that any values may be used for the trigger conditions. For example, other durations and other distances may be used as trigger conditions and more than two points may be used to project the path of the vehicle. Additionally, the projected path can be extrapolated from more than two previously measured points. Moreover, it should be appreciated that the trigger condition may include any combination of the trigger conditions listed above. In these examples, a measurement may be recorded at the earliest occurrence of any of the trigger conditions.

In some examples, a minimum traveled distance may also be used to prevent the occurrence of a trigger condition at block 603. This distance may represent the minimum distance that the GNSS device must travel before recording another point, regardless of the device's deviation from the projected path. For example, a minimum traveled distance of 5 cm may be used to prevent the GNSS device from recording points that are within 5 cm of each other.

FIG. 7 illustrates an example interface 700 that may be displayed on GNSS device 200 to configure the trigger conditions and/or minimum traveled distance. As shown, interface 700 includes the four trigger conditions, their associated threshold values, and check-boxes for selecting or deselecting the trigger conditions. The minimum travelled distance, its associated threshold value, and a check-box for selecting or deselecting the minimum threshold distance is also shown.

Referring back to FIG. 6, if a negative determination is made at block 603, the process may return to block 601 where the GNSS device may again measure its location. Blocks 601 and 603 may be periodically or intermittently performed with any desired frequency. If, however, a positive determination is instead made at block 603, the process may proceed to block 605 where the location of the point may be added to a set of points representing the path in a manner similar to that described above with respect to block 407. In some examples, points added to the set based on a threshold distance or threshold length of time elapsing may be recorded as "straight" points, while points added based on a threshold horizontal or vertical deviation may be recorded as "curved" points.

Figure 8:
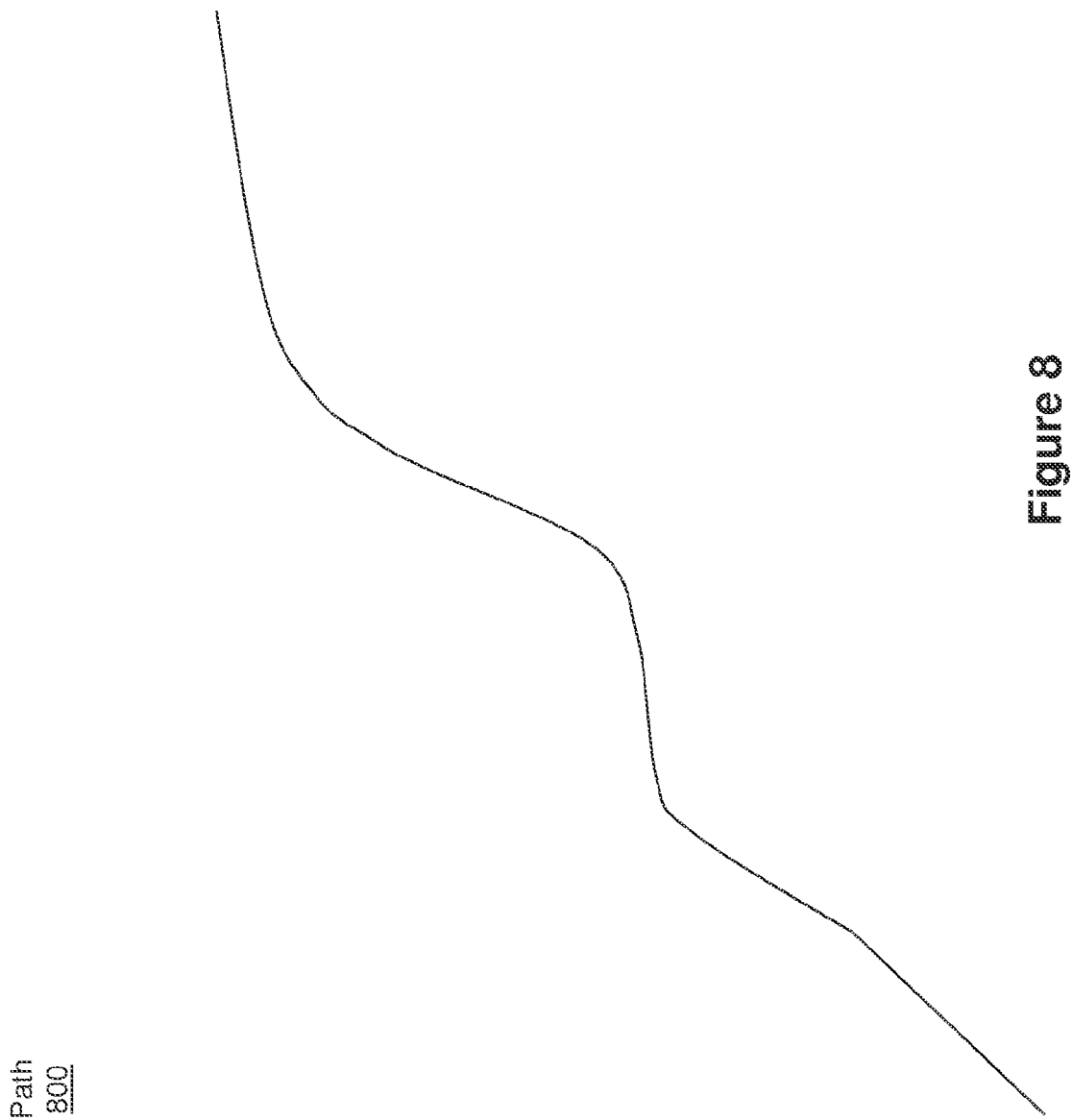
FIG. 8 illustrates a path that may be surveyed using a GNSS device according to various examples.
Figure 9:
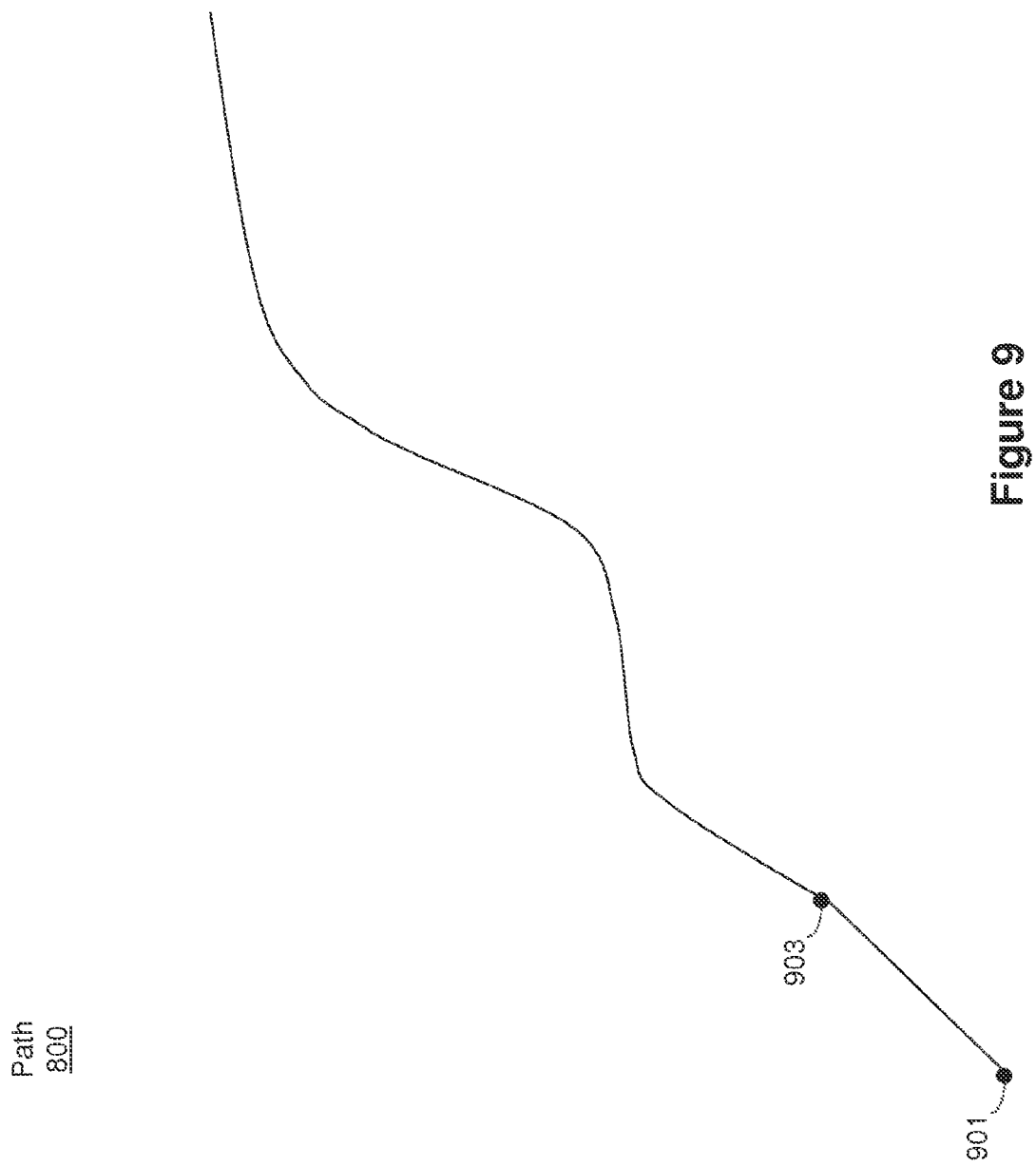
FIGS. 9-16 illustrate the surveying of the path shown in FIG. 8 using the process shown in FIG. 7.

To illustrate, FIG. 8 shows a path 800 that may be surveyed using process 600. In one example, a GNSS device 200 may be configured to have a trigger condition that includes a threshold distance of 10 m and a threshold horizontal deviation of 5 cm from a path projected based on the two most recently stored points. GNSS device 200 may begin surveying path 800 by measuring and recording the point 901 located at the start of the path, as shown in FIG. 9. As the GNSS device travels along the path, it may perform blocks 601 and 603 of process 600 to continually measure the position of the device and to determine if a trigger condition has occurred. Up until reaching point 903, the GNSS device may determine that no trigger condition has yet occurred because the device has not traveled the threshold distance and has not deviated from a projected path based on two previous stored points. Thus, a negative determination is repeatedly made at block 603. However, upon reaching point 903, it may be determined that the GNSS device has traveled the threshold distance. As a result, a positive determination may be made at block 603 and the GNSS device may store the point and its associated location at block 605.

Figure 10:
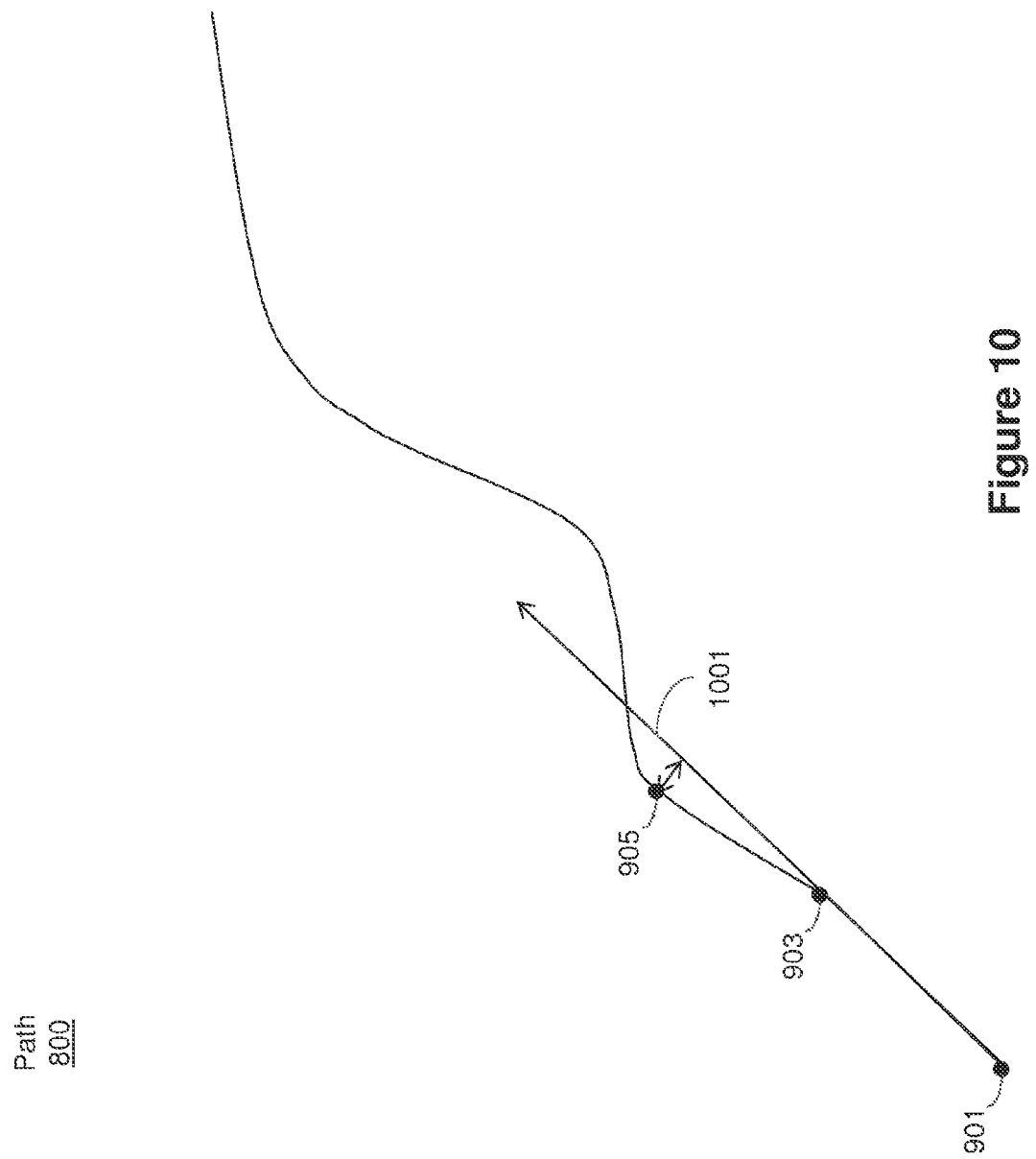

The GNSS device may continue to travel along path 800, repeatedly performing blocks 601 and 603 to measure the location of the device and determine if a trigger condition has occurred. Up until reaching point 905, shown in FIG. 10, the GNSS device may determine that no trigger condition has yet occurred because the device has not traveled the threshold distance and has not deviated from a projected path 1001 based on two previous stored points. This projected path 1001 represents a linear extrapolation of the two most recently stored points 901 and 903. Thus, a negative determination is repeatedly made at block 603. However, upon reaching point 905, it may be determined that the GNSS device has deviated from the projected path 1001 by the threshold horizontal distance of 10 cm as indicated by the double arrow. As a result, a positive determination may be made at block 603 and the GNSS device may store the point and its associated location at block 605.

Figure 11:
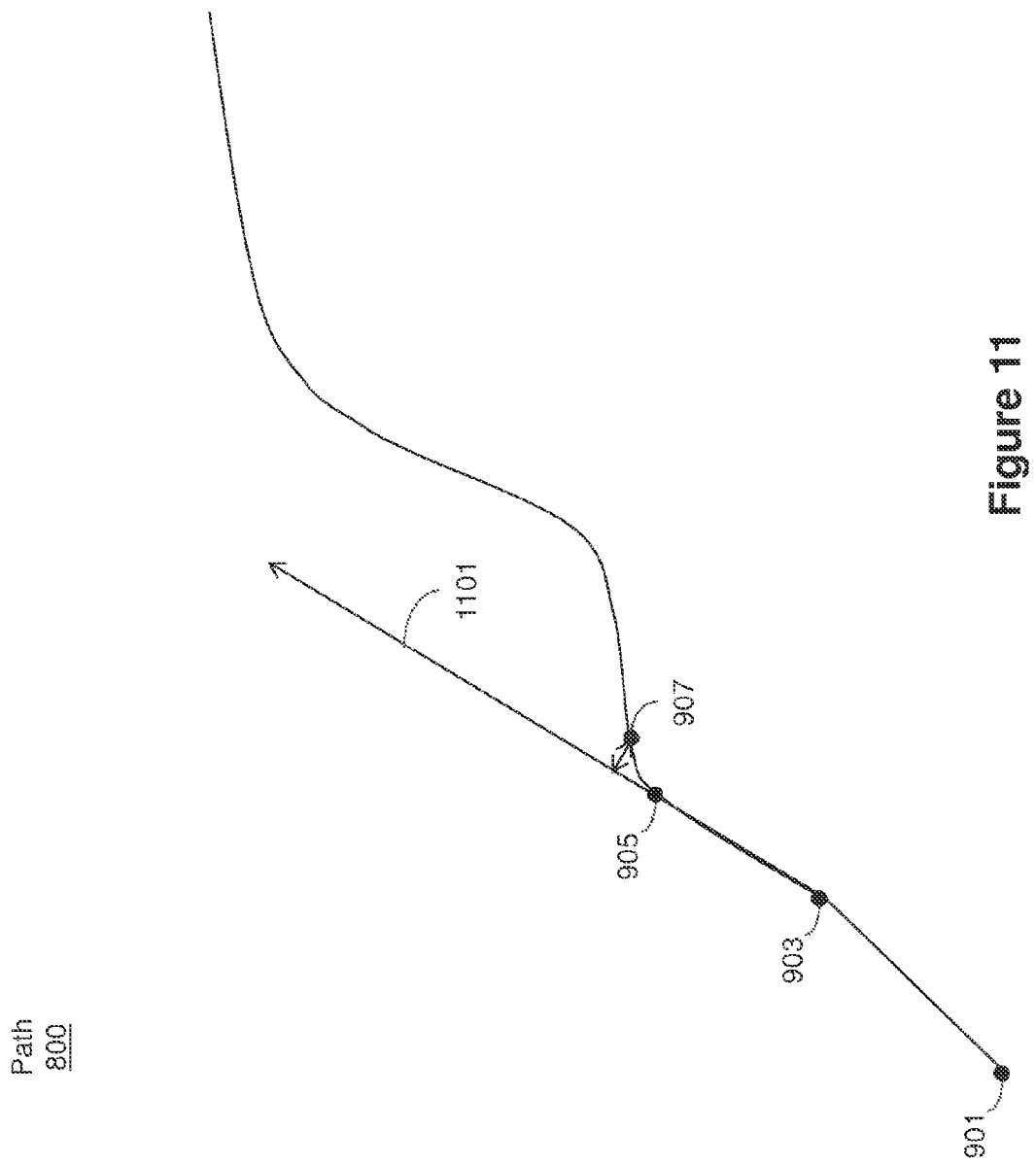
Figure 12:
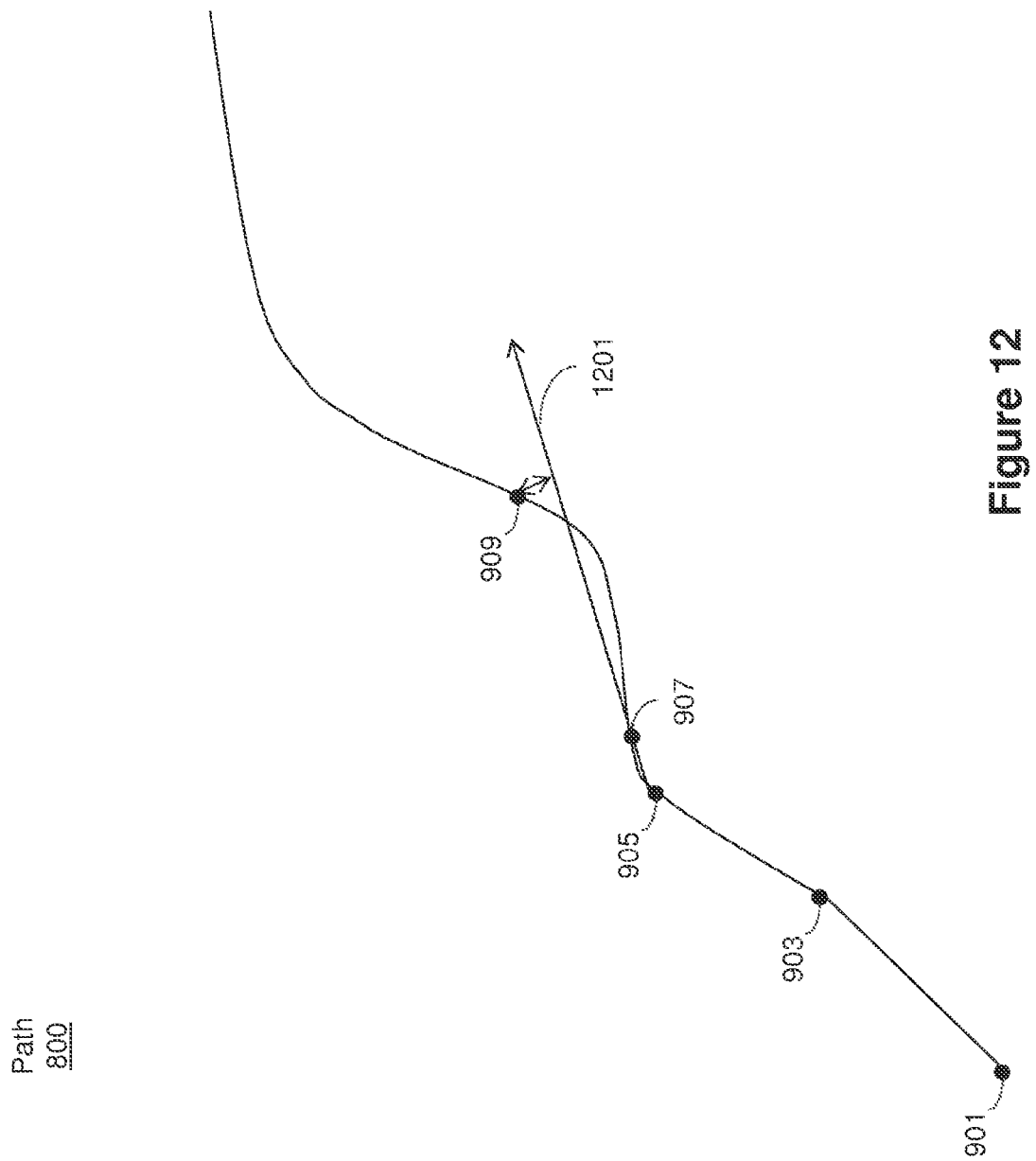
Figure 13:
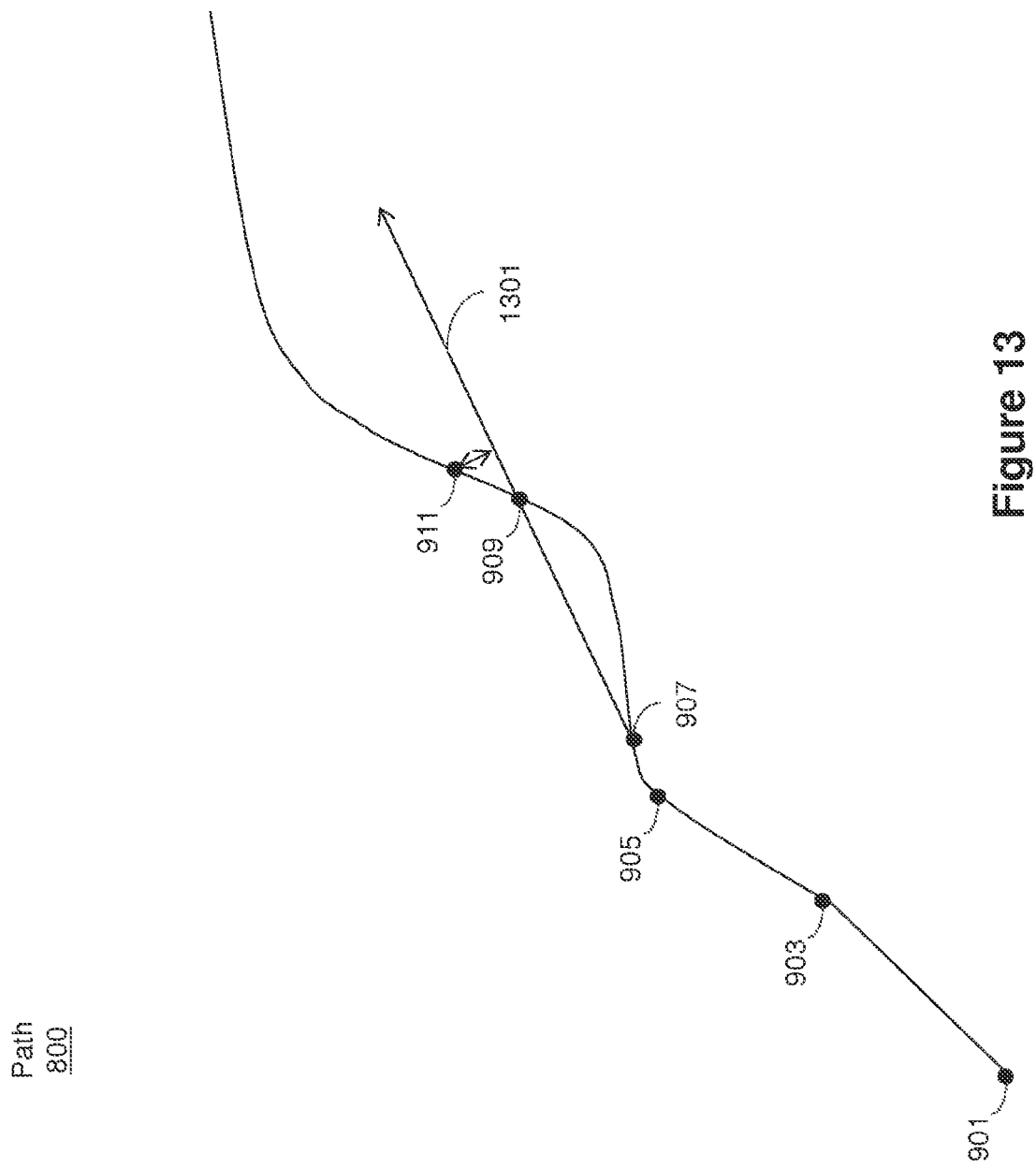
Figure 14:
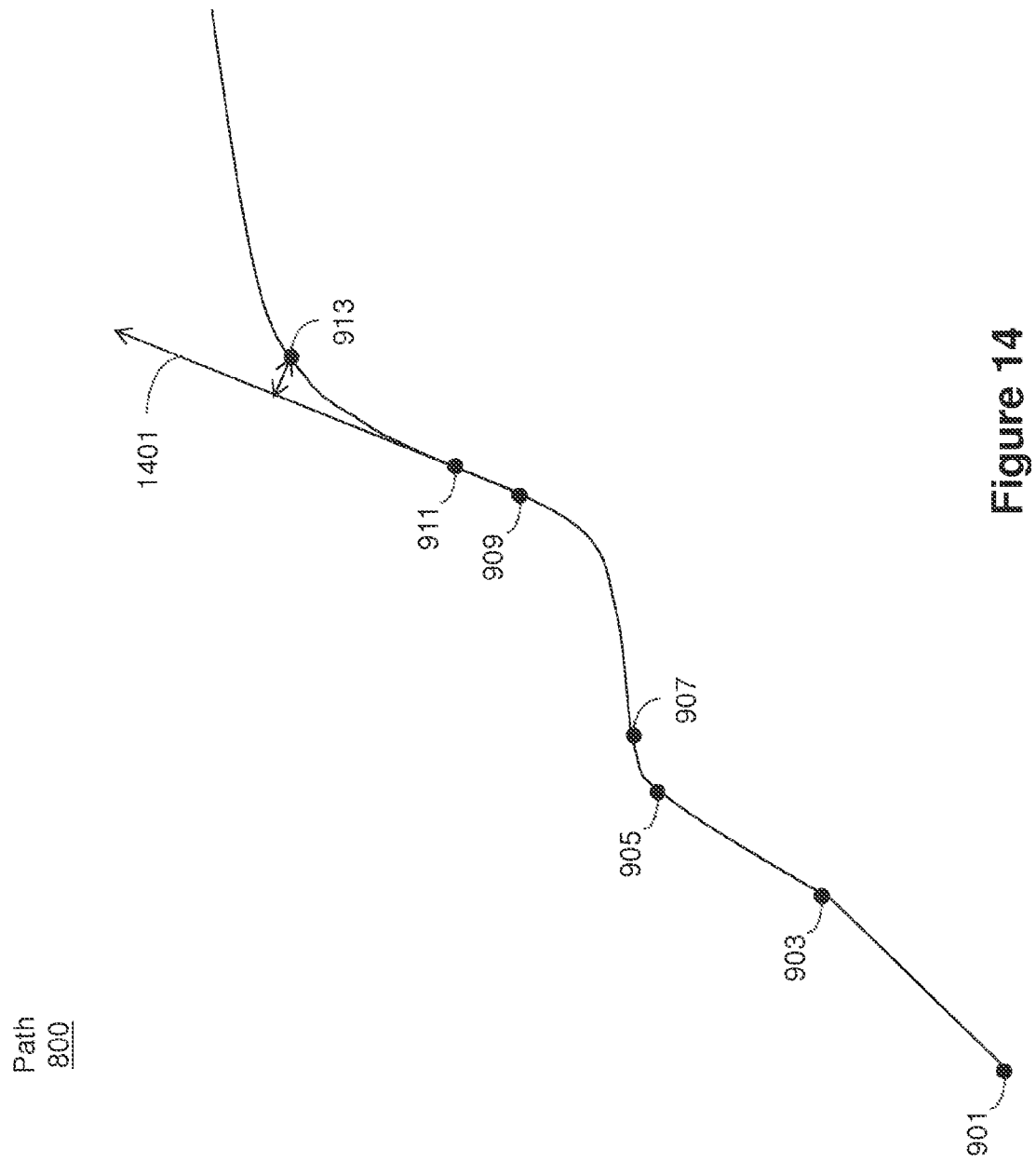
Figure 15:
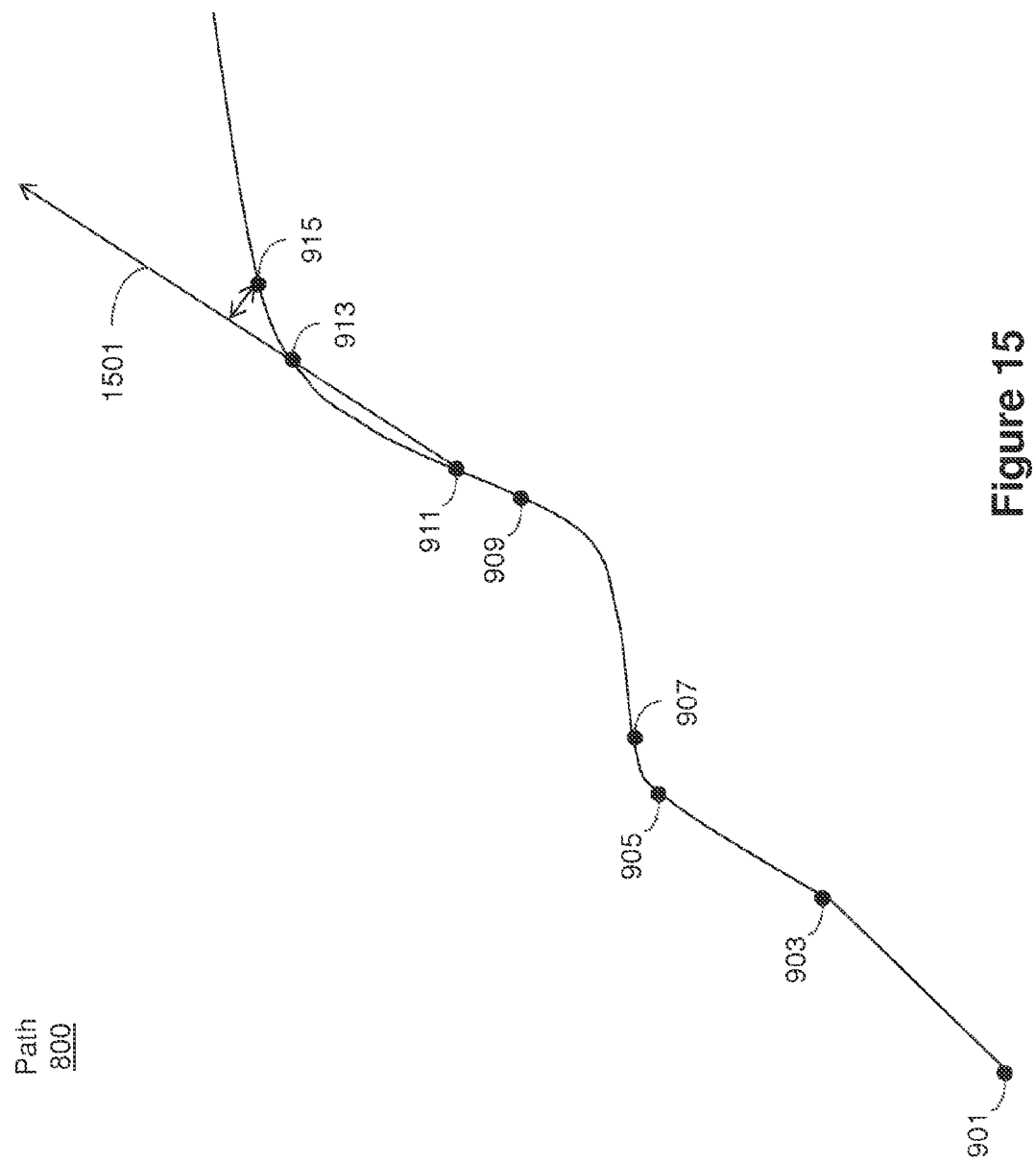
Figure 16:
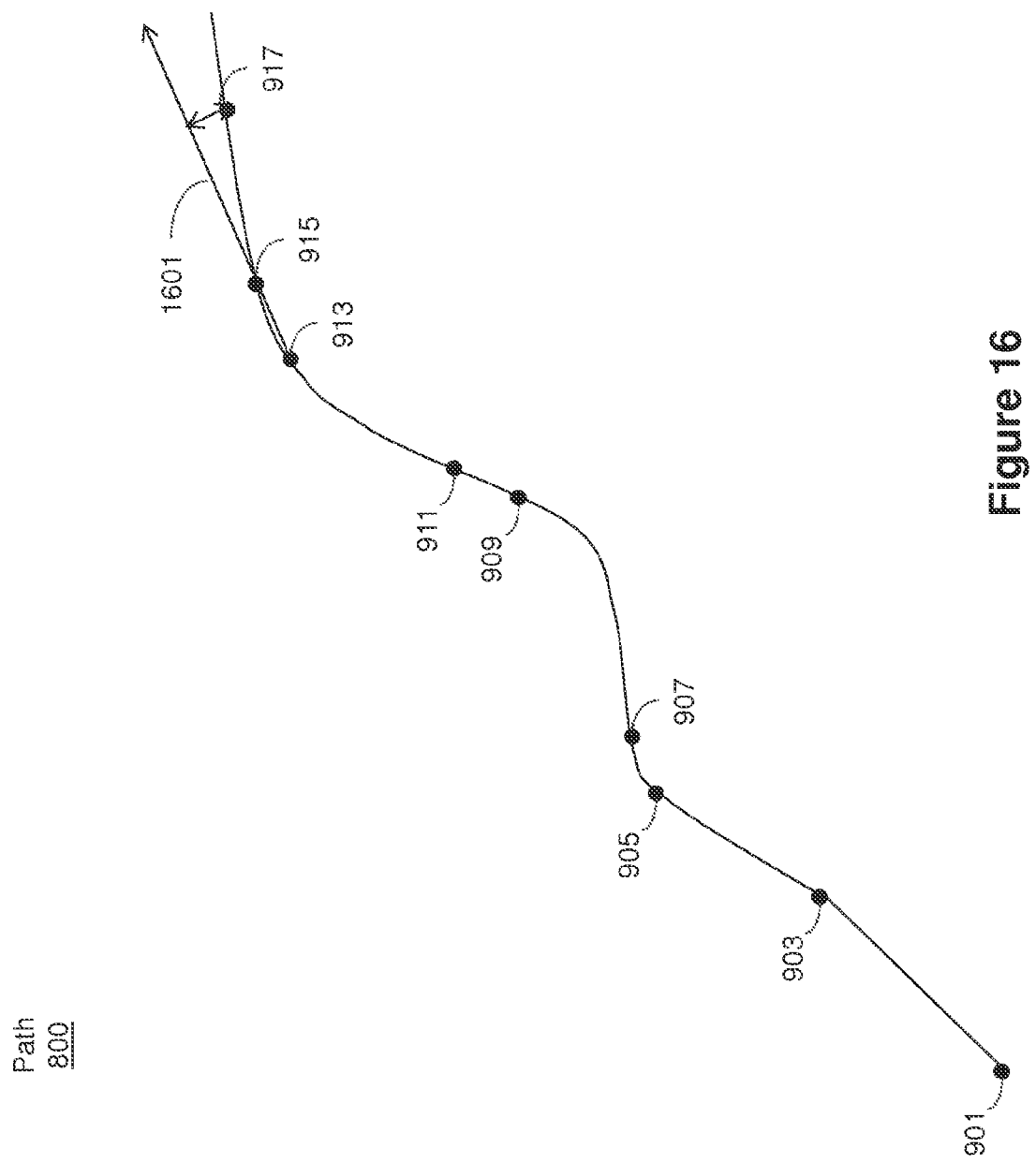

The GNSS device may continue to travel along path 800, repeatedly performing blocks 601 and 603 to measure the location of the device and determine if a trigger condition has occurred. Up until reaching point 907, shown in FIG. 11, the GNSS device may determine that no trigger condition has yet occurred because the device has not traveled the threshold distance and has not deviated from a projected path 1101 based on two previous stored points. This projected path 1101 represents a linear extrapolation of the two most recently stored points 903 and 905. Thus, a negative determination is repeatedly made at block 603. However, upon reaching point 907, it may be determined that the GNSS device has deviated from the projected path 1101 by the threshold horizontal distance of 10 cm as indicated by the double arrow. As a result, a positive determination may be made at block 603 and the GNSS device may store the point and its associated location at block 605.

Process 600 may be repeated to add points 909, 911, 913, 915, and 917 in a similar manner based on their horizontal deviation of 10 cm from projected paths 1201, 1301, 1401, 1501, and 1601, respectively, as shown in FIGS. 12-16. In the example provided above, points 901 and 903 may be identified as straight points since the measurement of these points were triggered by the start of the path and the threshold distance trigger. Points 905, 907, 909, 911, 913, 915, and 917 may be identified as curved points since the measurement of these points were triggered by the threshold horizontal deviation trigger.

Returning to FIG. 3, once the locations for a set of points on a path are recorded using process 400 and/or process 600, the process may proceed to block 303. At block 303, the set of points recorded at block 301 may be processed to generate a plot of the path represented by the set of points. While FIGS. 9-16 show the recording of points in response to reaching a threshold horizontal deviation from a projected path, it should be appreciated that process 600 may similarly be used to record points in response to reaching a threshold vertical deviation from a projected path.

Figure 17:
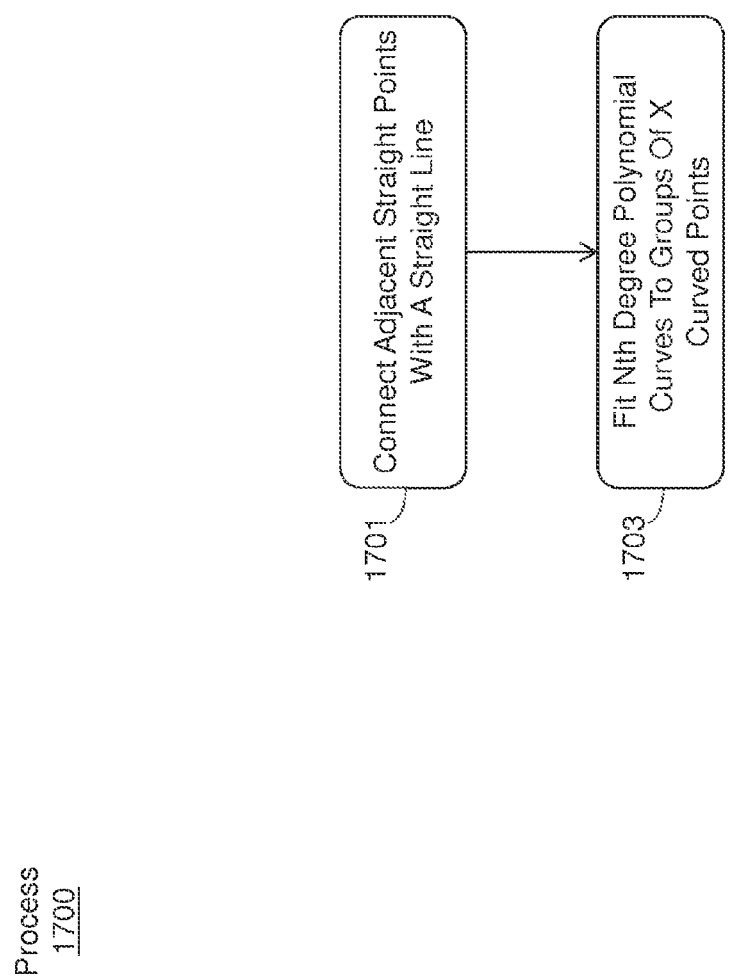
FIG. 17 illustrates an exemplary process for plotting a set of points representing a path according to various examples.

FIG. 17 illustrates an exemplary process for plotting a set of points representing a path according to various examples. At block 1701, adjacent points identified as being "straight" points may be connected together with straight lines.

Figure 18:
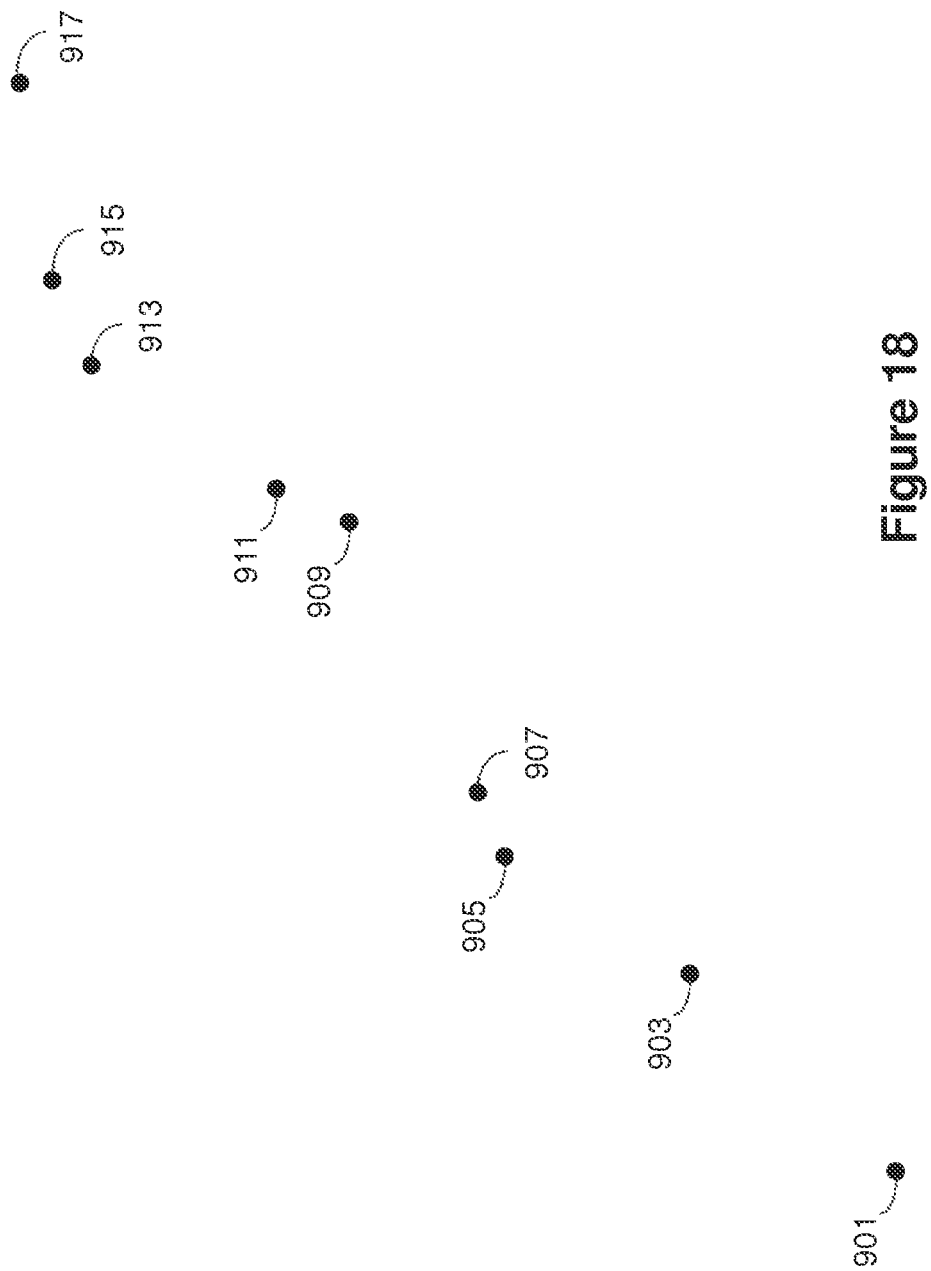
FIG. 18 illustrates an exemplary set of points representing a path according to various examples.
Figure 19:
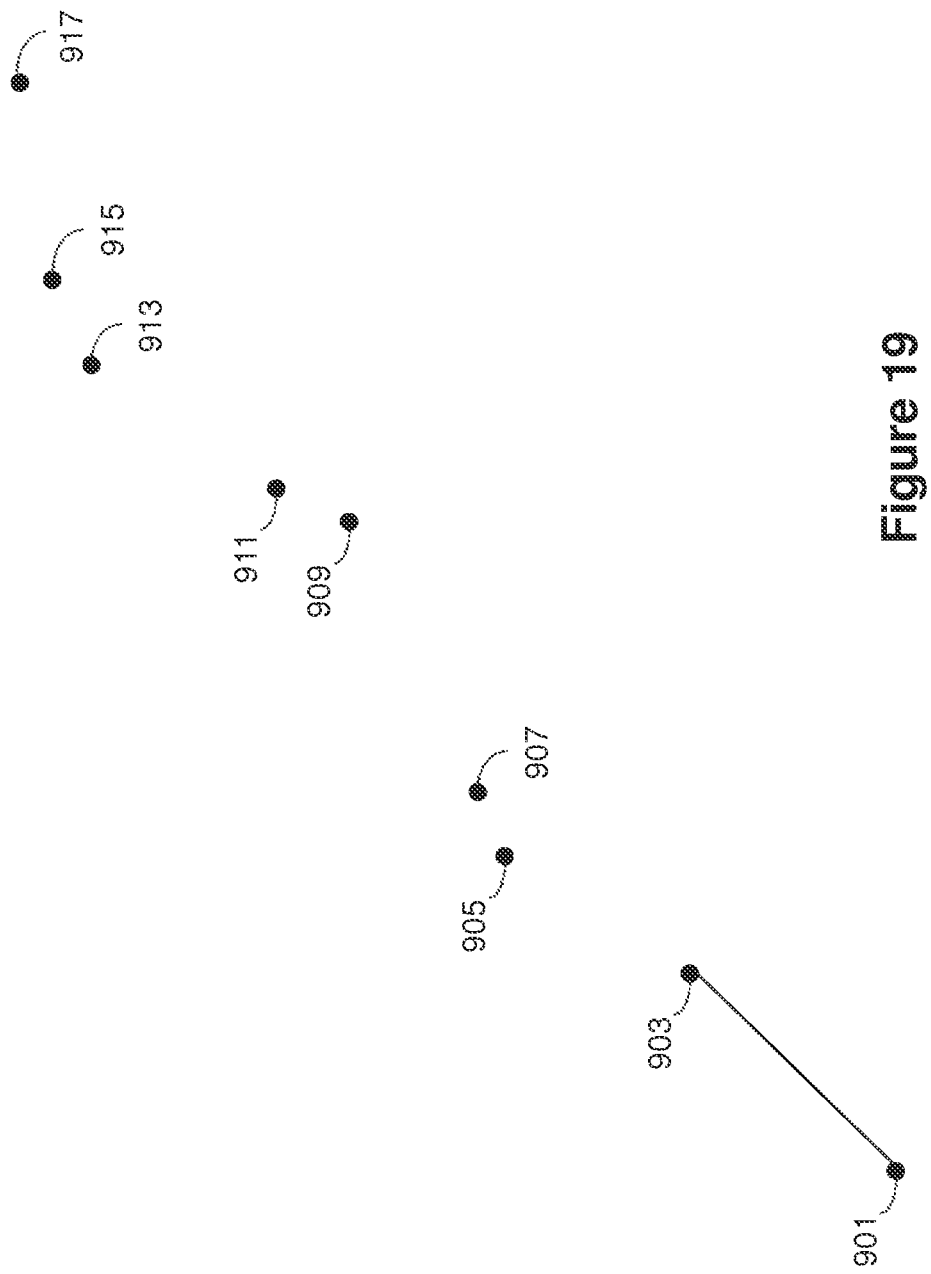
FIG. 19 illustrates the plotting of straight points from the set of points shown in FIG. 18 using the process shown in FIG. 17.

To illustrate, continuing with the example provided above, the set of points recorded at block 301 of process 300 may include points 901, 903, 905, 907, 909, 911, 913, 915, and 917 taken from path 800. A visual representation of these points is provided in FIG. 18. In this example, points 901 and 903 may be straight points since point 901 was recorded at the start of the path and because point 903 was recorded due to the minimum distance threshold being reached. As a result, at block 1701, a straight line may be generated that connects points 901 and 903, as shown in FIG. 19.

Figure 20:
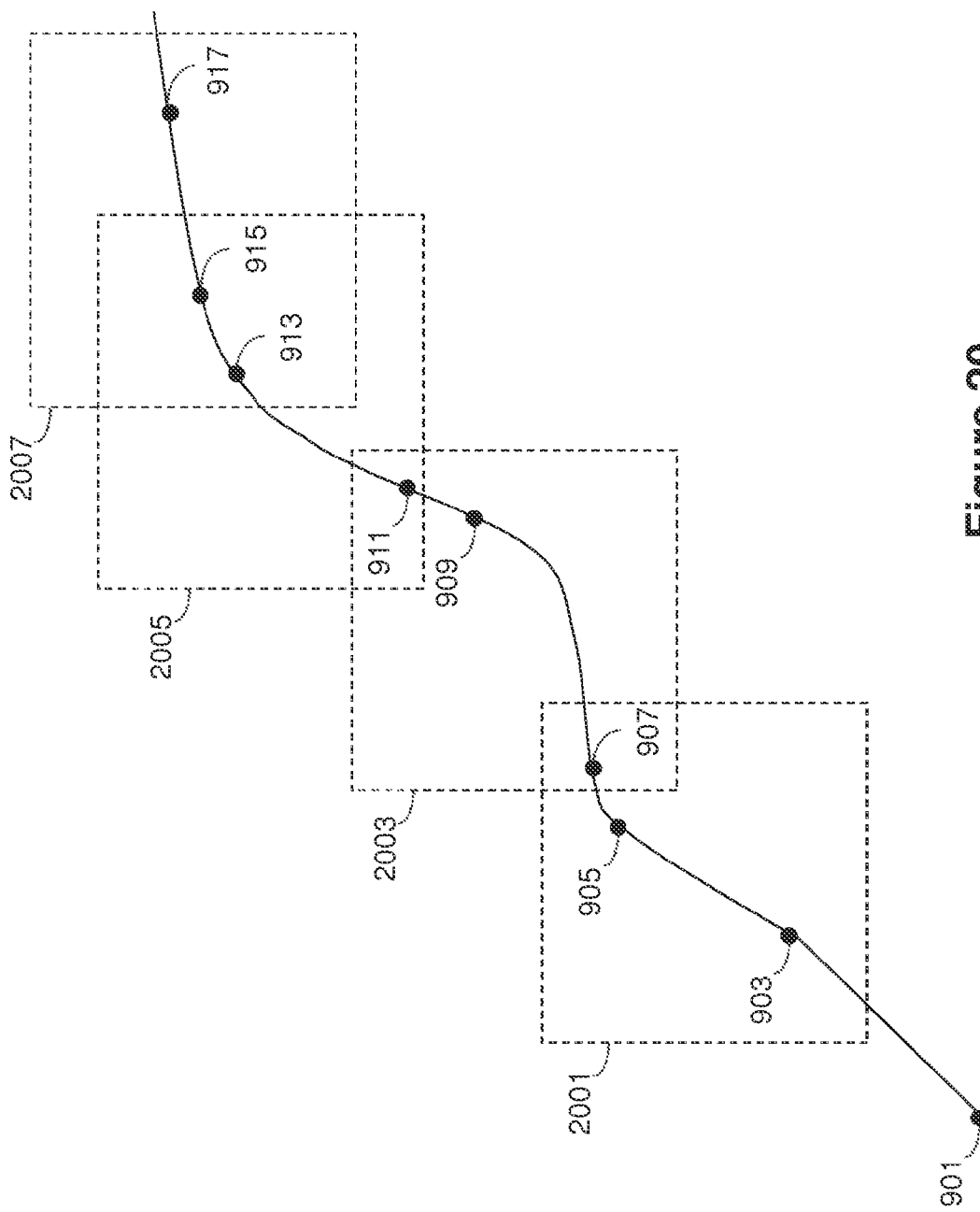
FIG. 20 illustrates the plotting of curved points from the set of points shown in FIG. 18 using the process shown in FIG. 17.

At block 1703, Nth-degree polynomial curves may be fit to groups of X curved points. In some examples, a second-degree polynomial may be fit to groups of three points. To illustrate, continuing with the example provided above, points 905, 907, 909, 911, 913, 915, and 917 may be identified as curved points since they were recorded in response to a threshold horizontal deviation from a projected path occurring. Thus, as shown in FIG. 20, these points have been grouped into sets of three, and a second-degree polynomial has been generated and used to connect the points. Note that the first set 2001 of three points includes straight point 903. This is because the point immediately after point 903 is curved point 905, indicating that the segment between these two points is also curved. Thus, the first second-degree polynomial segment is generated using the first set 2001 containing points 903, 905, and 907. The second set 2003 contains the last point from the previous set 2001 (point 907) and the next two points 909 and 911. Thus, a second-degree polynomial segment may also be generated using the second set 2003 containing points 907, 909, and 911. The segment can similarly be generated using the third set 2005 containing points 911, 913, and 915. The fourth set 2007, however, includes two points 913 and 915 from the previous set 2005. This is because there are an insufficient number of points following point 915 to generate the second-degree polynomial segment. As a result, two points from the third set 2005 have been added to the last point 917 to form a fourth set 2007 containing the requisite three points.

While the example for process 1700 has been described as generating a second-degree polynomial using three points, it should be appreciated that any Nth-degree polynomial may be generated using X number of points. Additionally, it should be appreciated that blocks 1701 and 1703 may be performed in any order or may be performed at the same time.

Figure 21:
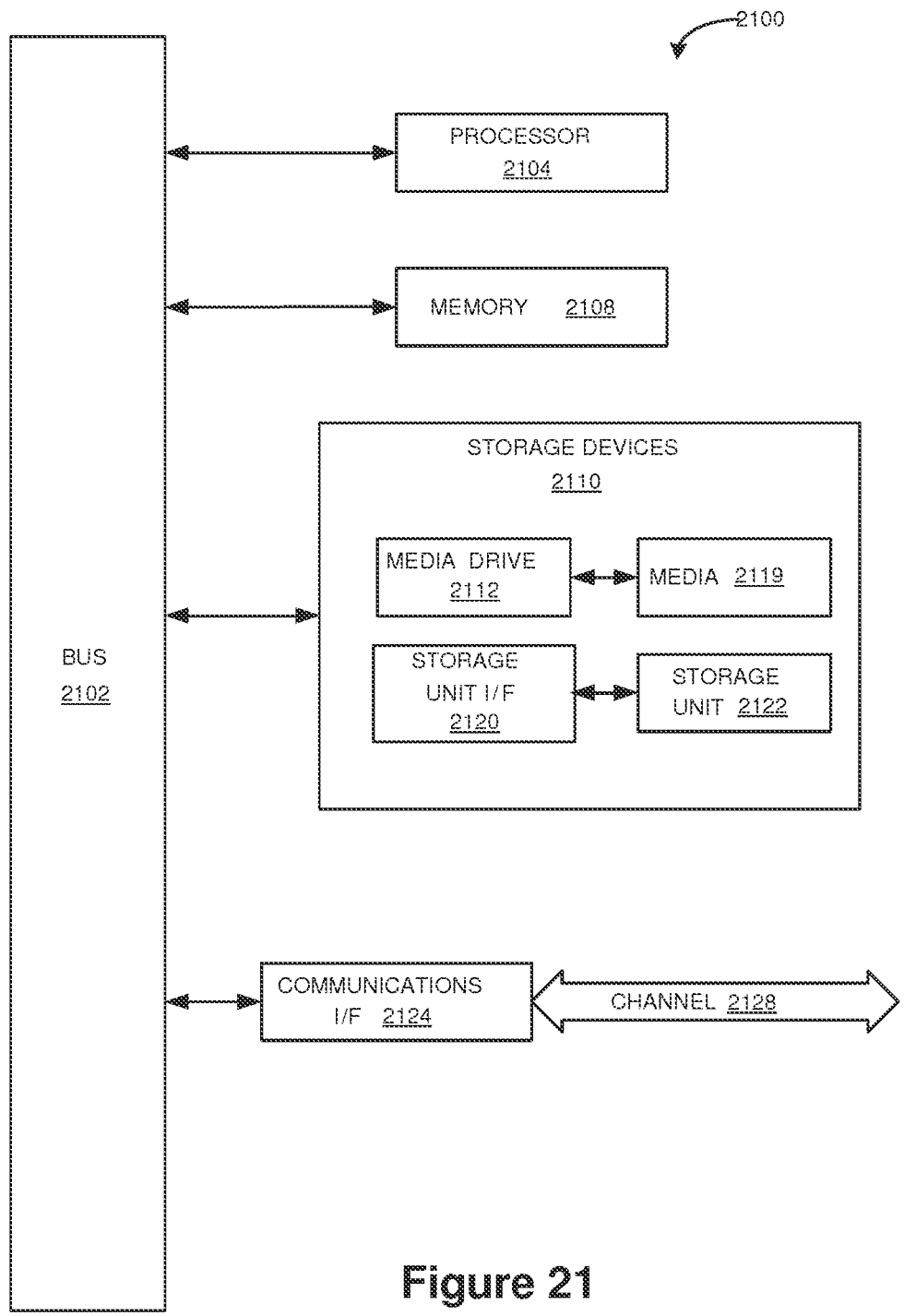
FIG. 21 illustrates an example computing system that may be employed to implement some or all of the processing functionality in certain examples.

FIG. 21 illustrates an exemplary computing system 2100 that may be employed to implement processing functionality for various aspects of the current technology. For example, computing system 2100 may be used to implement computing system 205 of GNSS device 200 and may be used to perform the steps of exemplary processes 400, 600, or 1700. Those skilled in the relevant art will also recognize how to implement the current technology using other computer systems or architectures. Computing system 2100 may represent, for example, a user device, such as a desktop, mobile phone, geodesic device, and so on as may be desirable or appropriate for a given application or environment. Computing system 2100 can include one or more processors, such as a processor 2104. Processor 2104 can be implemented using a general or special purpose processing engine such as, for example, a microprocessor, microcontroller or other control logic. In this example, processor 2104 is connected to a bus 2102 or other communication medium.

Computing system 2100 can also include a main memory 2108, such as random access memory (RAM) or other dynamic memory, for storing information and instructions to be executed by processor 2104. Main memory 2108 also may be used for storing temporary variables or other intermediate information during execution of instructions to be executed by processor 2104. Computing system 2100 may likewise include a read only memory ("ROM") or other static storage device coupled to bus 2102 for storing static information and instructions for processor 2104.

The computing system 2100 may also include information storage mechanism 2110, which may include, for example, a media drive 2112 and a removable storage interface 2120. The media drive 2112 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 2118 may include, for example, a hard disk, floppy disk, magnetic tape, optical disk, CD or DVD, or other fixed or removable medium that is read by and written to media drive 2112. As these examples illustrate, the storage media 2118 may include a non-transitory computer-readable storage medium having stored therein particular computer software or data.

In alternative embodiments, information storage mechanism 2110 may include other similar instrumentalities for allowing computer programs or other instructions or data to be loaded into computing system 2100. Such instrumentalities may include, for example, a removable storage unit 2122 and an interface 2120, such as a program cartridge and cartridge interface, a removable memory (for example, a flash memory or other removable memory module) and memory slot, and other removable storage units 2122 and interfaces 2120 that allow software and data to be transferred from the removable storage unit 2122 to computing system 2100.

Computing system 2100 can also include a communications interface 2124. Communications interface 2124 can be used to allow software and data to be transferred between computing system 2100 and external devices. Examples of communications interface 2124 can include a modem, a network interface (such as an Ethernet or other NIC card), a communications port (such as for example, a USB port), a PCMCIA slot and card, etc. Software and data transferred via communications interface 2124. Some examples of a channel 2128 include a phone line, a cellular phone link, an RF link, a network interface, a local or wide area network, and other communications channels.

In this document, the terms "computer program product" and "non-transitory computer-readable storage medium" may be used generally to refer to media such as, for example, memory 2108, storage media 2118, or removable storage unit 2122. These and other forms of non-transitory computer-readable storage media may be involved in providing one or more sequences of one or more instructions to processor 2104 for execution. Such instructions, generally referred to as "computer program code" (which may be grouped in the form of computer programs or other groupings), when executed, enable the computing system 2100 to perform features or functions of embodiments of the current technology.

In an embodiment where the elements are implemented using software, the software may be stored in a non-transitory computer-readable storage medium and loaded into computing system 2100 using, for example, removable storage drive 2122, media drive 2112 or communications interface 2124. The control logic (in this example, software instructions or computer program code), when executed by the processor 2104, causes the processor 2104 to perform the functions of the technology as described herein.

It will be appreciated that, for clarity purposes, the above description has described embodiments with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A computer-implemented method for surveying a path using a global navigation satellite system (GNSS) device, the method comprising:
   at the GNSS device:
      receiving, by the GNSS device, a request to add a point on the path to a set of points;
      determining a location of the point;
      in response to determining a location of the point, determining if the point is a new point or a previously measured point from the set of points;
      in response to determining that the point is a new point, adding the point to the set of points using the determined location of the point; and
      in response to determining that the point is a previously measured point from the set of points, adding the point to the set of points using a location of a corresponding point from the set of points.

2. The method of claim 1, wherein the request to add the point on the path to the set of points identifies the point as being a new point or a previously measured point from the set of points, and wherein determining if the point is a new point or a previously measured point from the set of points is performed based on the request.

3. The method of claim 1, wherein determining if the point is a new point or a previously measured point from the set of points comprises:
   determining that the point is a previously measured point if the location of the point is within a threshold distance to a location of a point in the set of points; and
   determining that the point is a new point if the location of the point is not within the threshold distance to a location of a point in the set of points.

4. The method of claim 3, further comprising:
   in response to determining that only a single point from the set of points has a location within the threshold distance from the location of the point, selecting the single point to be the corresponding point from the set of points; and in response to determining that more than one point from the set of points has a location within the threshold distance from the location of the point:

causing a display of at least a portion of the previously measured points from the set of points; and receiving a selection of one of the displayed previously measured points, wherein the selected previously measured point is used as the corresponding point from the set of points.

5. The method of claim 4, wherein the at least a portion of the previously measured points from the set of points comprises all points from the set of points having locations within the threshold distance from the point.

6. The method of claim 1, wherein adding the point to the set of points using the determined location of the point comprises storing the point and the determined location of the point in a data structure representing the set of points.

7. The method of claim 1, wherein adding the point to the set of points using the location of the corresponding point from the set of points comprises storing the point and the location of the corresponding point from the set of points in a data structure representing the set of points.

8. The method of claim 1, wherein the set of points comprises associated data for each point in the set of points, and wherein the associated data comprises a location of each point in the set of points, an identification of an object that each point in the set of points represents, a unique identifier for each point in the set of points, a tag identifying each point in the set of points as a junction or non-junction point, and an indicator identifying each point in the set of points as being a straight point or a curved point.

9. The method of claim 1, wherein the method further comprises plotting the points in the set of points to generate a computer generated representation of the path.

10. The method of claim 9, wherein each point in the set of points is identified as being a straight point or a curved point, and wherein plotting the points comprises connecting straight points with straight lines and connecting curved points with polynomial segments.

11. A computer-implemented method for surveying a path using a global navigation satellite system (GNSS) device, the method comprising:

measuring, by the GNSS device, a location associated with the GNSS device;

determining if a trigger condition has occurred, wherein the trigger condition comprises a threshold length of time since a last point was recorded, a threshold distance traveled since the last point was recorded, and a threshold deviation from a projected path; and in response to the trigger condition occurring, recording the measured location as a point in a set of points.

12. The method of claim 11, wherein the trigger condition occurs if any of the threshold length of time since the last point was recorded, the threshold distance traveled since the last point was recorded, and the threshold deviation from a projected path is reached.

13. The method of claim 11, wherein the trigger condition further comprises a minimum distance traveled since the last point was recorded, and wherein the trigger condition does not occur unless the minimum distance traveled since the last point was recorded is reached.

14. The method of claim 11, wherein the threshold deviation from the projected path comprises a threshold horizontal deviation or a threshold vertical deviation from the projected path.

15. The method of claim 11, wherein the projected path is generated based on a linear extrapolation of the at least two most recently recorded points in the set of points.

16. The method of claim 11, wherein recording the measured location as the point in the set of points comprises:

storing the point and associated data in a data structure representing the set of points; and identifying the point as a straight point or a curved point, wherein the point is identified as a straight point if the threshold length of time since the last point was recorded or the threshold distance traveled since the last point was recorded caused the trigger condition to occur, and wherein the point is identified as a curved point if the threshold deviation from the projected path caused the trigger condition to occur.

17. The method of claim 11, wherein the method further comprises plotting the points in the set of points to generate a computer generated representation of the path.

18. The method of claim 17, wherein each point in the set of points is identified as being a straight point or a curved point, and wherein plotting the points comprises connecting straight points with straight lines and connecting curved points with polynomial segments.

19. An apparatus for surveying a path, the apparatus comprising:

a global navigation satellite system (GNSS) receiver for receiving a plurality of satellite signals; and a processor configured to:

receive a request to add a point on the path to a set of points;

determine a location of the point using the GNSS receiver;

in response to determining a location of the point, determine if the point is a new point or a previously measured point from the set of points;

in response to determining that the point is a new point, add the point to the set of points using the determined location of the point; and in response to determining that the point is a previously measured point from the set of points, add the point to the set of points using a location of a corresponding point from the set of points.

20. The apparatus of claim 19, wherein the request to add the point on the path to the set of points identifies the point as being a new point or a previously measured point from the set of points, and wherein determining if the point is a new point or a previously measured point from the set of points is performed based on the request.

21. The apparatus of claim 19, wherein determining if the point is a new point or a previously measured point from the set of points comprises:

determining that the point is a previously measured point if the location of the point is within a threshold distance to a location of a point in the set of points; and determining that the point is a new point if the location of the point is not within the threshold distance to a location of a point in the set of points.

22. The apparatus of claim 21, wherein the processor is further configured to:

in response to determining that only a single point from the set of points has a location within the threshold distance from the location of the point, select the single point to be the corresponding point from the set of points; and in response to determining that more than one point from the set of points has a location within the threshold distance from the location of the point:
cause a display of at least a portion of the previously measured points from the set of points; and
receive a selection of one of the displayed previously measured points, wherein the selected previously measured point is used as the corresponding point from the set of points.

23. The apparatus of claim 22, wherein the at least a portion of the previously measured points from the set of points comprises all points from the set of points having locations within the threshold distance from the point.

24. The apparatus of claim 19, wherein the set of points comprises associated data for each point in the set of points, and wherein the associated data comprises a location of each point in the set of points, an identification of an object that each point in the set of points represents, a unique identifier for each point in the set of points, a tag identifying each point in the set of points as a junction or non-junction point, and an indicator identifying each point in the set of points as being a straight point or a curved point.

25. The apparatus of claim 19, wherein the processor is further configured to plot the points in the set of points to generate a computer generated representation of the path.

26. An apparatus for surveying a path, the apparatus comprising:
a global navigation satellite system (GNSS) receiver for receiving a plurality of satellite signals; and
a processor configured to:
measure, using the GNSS device, a location associated with the apparatus;
determine if a trigger condition has occurred, wherein the trigger condition comprises a threshold length of time since a last point was recorded, a threshold distance traveled since the last point was recorded, and a threshold deviation from a projected path; and
in response to the trigger condition occurring, record the measured location as a point in a set of points.

27. The apparatus of claim 26, wherein the trigger condition occurs if any of the threshold length of time since the last point was recorded, the threshold distance traveled since the last point was recorded, and the threshold deviation from a projected path is reached.

28. The apparatus of claim 26, wherein the trigger condition further comprises a minimum distance traveled since the last point was recorded, and wherein the trigger condition does not occur unless the minimum distance traveled since the last point was recorded is reached.

29. The apparatus of claim 26, wherein the threshold deviation from the projected path comprises a threshold horizontal deviation or a threshold vertical deviation from the projected path.

30. The apparatus of claim 26, wherein the projected path is generated based on a linear extrapolation of the at least two most recently recorded points in the set of points.

31. The apparatus of claim 26, wherein recording the measured location as the point in the set of points comprises:
storing the point and associated data in a data structure representing the set of points; and
identifying the point as a straight point or a curved point, wherein the point is identified as a straight point if the threshold length of time since the last point was recorded or the threshold distance traveled since the last point was recorded caused the trigger condition to occur, and wherein the point is identified as a curved point if the threshold deviation from the projected path caused the trigger condition to occur.

32. The apparatus of claim 26 wherein the processor is further configured to plot the points in the set of points to generate a computer generated representation of the path.

* * * * *